US011870533B2

(12) United States Patent
Zhou et al.

(10) Patent No.: US 11,870,533 B2
(45) Date of Patent: Jan. 9, 2024

(54) TECHNIQUES FOR INDIVIDUAL BEAM FAILURE DETECTION

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 17/463,489

(22) Filed: Aug. 31, 2021

(65) Prior Publication Data
US 2023/0066874 A1 Mar. 2, 2023

(51) Int. Cl.
| | |
|---|---|
| *H04B 7/08* | (2006.01) |
| *H04W 24/08* | (2009.01) |
| *H04W 76/19* | (2018.01) |
| *H04W 80/02* | (2009.01) |
| *H04B 7/06* | (2006.01) |

(52) U.S. Cl.
CPC ............ *H04B 7/088* (2013.01); *H04W 24/08* (2013.01); *H04W 76/19* (2018.02); *H04W 80/02* (2013.01)

(58) Field of Classification Search
CPC ...... H04B 7/088; H04W 24/08; H04W 76/19; H04W 80/02
See application file for complete search history.

(56) References Cited

U.S. PATENT DOCUMENTS

| | | | | |
|---|---|---|---|---|
| 2016/0150435 A1* | 5/2016 | Baek | ................... | H04B 7/0608 370/252 |
| 2020/0328796 A1* | 10/2020 | Turtinen | ............... | H04B 7/0695 |
| 2022/0132517 A1* | 4/2022 | Zhu | ........................ | H04L 5/0023 |
| 2022/0330055 A1* | 10/2022 | Babaei | .................. | H04W 24/08 |
| 2022/0394535 A1* | 12/2022 | Li | ........................ | H04L 27/0006 |

* cited by examiner

*Primary Examiner* — Harry H Kim
(74) *Attorney, Agent, or Firm* — Holland & Hart LLP

(57) ABSTRACT

Methods, systems, and devices for wireless communications are described. A user equipment (UE) may receive, from a base station, control signaling indicating an activation of a beam failure detection (BFD) procedure for detecting beam failure on a per-beam basis for a set of beams. The UE may receive control signaling indicating BFD parameters for each beam to use in accordance with the BFD procedure. The UE may monitor for a set of reference signals via the set of beams and maintain, at a medium access control (MAC) layer, a separate beam failure indication (BFI) counter and a BFD timer for each beam. The MAC layer may receive the BFIs from a physical layer at the UE such that if the BFI counter for a beam satisfies a configured BFI threshold count before a configured BFD timing duration, the UE may transmit a beam failure recovery request to the base station for the beam.

28 Claims, 16 Drawing Sheets

TECHNIQUES FOR INDIVIDUAL BEAM FAILURE DETECTION

FIELD OF TECHNOLOGY

The following relates to wireless communications, including techniques for individual beam failure detection (BFD).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may include one or more base stations and one or more UEs communicating using one or more beams. The beams may experience interference resulting in one or more beam failures. However, in some cases, existing beam failure detection and recovery techniques may be deficient.

SUMMARY

The described techniques relate to improved methods, systems, devices, and apparatuses that support techniques for individual beam failure detection (BFD). Generally, the described techniques provide for a base station and a user equipment (UE) communicating using one or more beams to conduct a BFD procedure on a per beam basis. In such systems, the UE may receive from the base station an indication to operate in accordance with a BFD procedure on a per beam basis. The UE may monitor each beam of the one or more beams for an associated BFD reference signal (BFD-RS) that the base station may transmit on a periodic basis. The UE may estimate the BLER associated with each BFD-RS and determine a beam failure indication (BFI) for each beam that has a BFD-RS with an associated BLER greater than a configured threshold. A physical (PHY) layer at the UE may indicate the BFI for each beam to a medium access control (MAC) layer at the UE. The MAC layer may maintain a BFI counter and a BFD timer per BFI beam such that if the BFI count for a given beam exceeds its respective threshold during the configured BFD timer, the UE may transmit a beam failure recovery request to the base station for that respective beam.

A method for wireless communications at a user equipment (UE) is described. The method may include receiving, from a base station, control signaling indicating an activation of a beam failure detection procedure for detecting beam failure on a per-beam basis for a set of beams, monitoring for a set of reference signals via the set of beams, maintaining, at a first protocol layer of the UE, a separate beam failure indication counter for each beam of the set of beams based on beam failure indications obtained from a second protocol layer of the UE on a per-beam basis in accordance with the beam failure detection procedure, and performing a beam failure recovery procedure for a first beam of the set of beams based on a first beam failure indication counter for the first beam.

An apparatus for wireless communications at a UE is described. The apparatus may include a processor, memory coupled with the processor, and instructions stored in the memory. The instructions may be executable by the processor to cause the apparatus to receive, from a base station, control signaling indicating an activation of a beam failure detection procedure for detecting beam failure on a per-beam basis for a set of beams, monitor for a set of reference signals via the set of beams, maintaining, at a first protocol layer of the UE, a separate beam failure indication counter for each beam of the set of beams base at least in part on beam failure indications obtained from a second protocol layer of the UE on a per-beam basis in accordance with the beam failure detection procedure, and perform a beam failure recovery procedure for a first beam of the set of beams based on a first beam failure indication counter for the first beam.

Another apparatus for wireless communications at a UE is described. The apparatus may include means for receiving, from a base station, control signaling indicating an activation of a beam failure detection procedure for detecting beam failure on a per-beam basis for a set of beams, means for monitoring for a set of reference signals via the set of beams, means for maintaining, at a first protocol layer of the UE, a separate beam failure indication counter for each beam of the set of beams based on beam failure indications obtained from a second protocol layer of the UE on a per-beam basis in accordance with the beam failure detection procedure, and means for performing a beam failure recovery procedure for a first beam of the set of beams based on a first beam failure indication counter for the first beam.

A non-transitory computer-readable medium storing code for wireless communications at a UE is described. The code may include instructions executable by a processor to receive, from a base station, control signaling indicating an activation of a beam failure detection procedure for detecting beam failure on a per-beam basis for a set of beams, monitor for a set of reference signals via the set of beams, maintaining, at a first protocol layer of the UE, a separate beam failure indication counter for each beam of the set of beams base at least in part on beam failure indications obtained from a second protocol layer of the UE on a per-beam basis in accordance with the beam failure detection procedure, and perform a beam failure recovery procedure for a first beam of the set of beams based on a first beam failure indication counter for the first beam.

Some examples of the method, apparatuses, and non-transitory computer-readable medium described herein may further include operations, features, means, or instructions for receiving, from the base station, control signaling indicating beam failure detection parameters for each beam of the set of beams, where performing the beam failure recovery procedure for the first beam may be based on a first set of beam failure detection parameters for the first beam.

In some examples of the method, apparatuses, and non-transitory computer-readable medium described herein, the beam failure detection procedure for detecting beam failure on a per-beam basis may be based on the beam failure detection parameters for each beam of the set of beams.

In some examples of the method, apparatuses, and non-transitory computer-readable medium described herein, the beam failure detection parameters include a beam failure detection timer duration, a beam failure count threshold, or both, for each beam of the set of beams.

Some examples of the method, apparatuses, and non-transitory computer-readable medium described herein may further include operations, features, means, or instructions for receiving, from the base station, control signaling indicating selected beam failure detection parameters corresponding to one or more beams of the set of beams, where performing the beam failure recovery procedure for the first beam may be based on a first selected beam failure detection parameter for the first beam.

In some examples of the method, apparatuses, and non-transitory computer-readable medium described herein, the beam failure detection procedure for detecting beam failure on a per-beam basis may be based on the selected beam failure detection parameters.

Some examples of the method, apparatuses, and non-transitory computer-readable medium described herein may further include operations, features, means, or instructions for transmitting, to the base station, a request to change one or more beam failure detection parameters, where the control signaling indicating the selected beam failure detection parameters may be received based on transmitting the request.

In some examples of the method, apparatuses, and non-transitory computer-readable medium described herein, maintaining the separate beam failure indication counter for each beam of the set of beams may include operations, features, means, or instructions for incrementing, at the first protocol layer, the separate beam failure indication counter for each beam of the set of beams based on obtaining beam failure indications from the second protocol layer on a per-beam basis, where performing the beam failure recovery procedure for the first beam may be based on the first beam failure indication counter satisfying a count threshold.

In some examples of the method, apparatuses, and non-transitory computer-readable medium described herein, maintaining the separate beam failure indication counter for each beam of the set of beams may include operations, features, means, or instructions for activating, at the first protocol layer, a separate beam failure detection timer for each beam of the set of beams based on obtaining beam failure indications from the second protocol layer on a per-beam basis, where performing the beam failure recovery procedure for the first beam may be based on a quantity of beam failure indications obtained for the first beam before a beam failure detection timer for the first beam expires.

Some examples of the method, apparatuses, and non-transitory computer-readable medium described herein may further include operations, features, means, or instructions for transmitting, to the base station, signaling indicating the beam failure recovery procedure for the first beam.

Some examples of the method, apparatuses, and non-transitory computer-readable medium described herein may further include operations, features, means, or instructions for receiving, from the base station, control signaling indicating a beamforming configuration based on the signaling indicating the beam failure recovery procedure for the first beam and communicating with the base station in accordance with the beamforming configuration.

In some examples of the method, apparatuses, and non-transitory computer-readable medium described herein, the signaling indicating the beam failure recovery procedure for the first beam identifies one or more candidate beams.

Some examples of the method, apparatuses, and non-transitory computer-readable medium described herein may further include operations, features, means, or instructions for performing a second beam failure recovery procedure for a second beam of the set of beams based on a second beam failure indication counter for the second beam.

Some examples of the method, apparatuses, and non-transitory computer-readable medium described herein may further include operations, features, means, or instructions for determining a block error rate associated with the received set of reference signals, where the beam failure indications obtained from the second protocol layer may be based on the block error rate satisfying a block error rate threshold for one or more beams of the set of beams.

In some examples of the method, apparatuses, and non-transitory computer-readable medium described herein, the set of reference signals includes a channel state information reference signal, a synchronization signal block, or both.

In some examples of the method, apparatuses, and non-transitory computer-readable medium described herein, the first protocol layer includes a medium access control layer and the second protocol layer includes a physical layer.

In some examples of the method, apparatuses, and non-transitory computer-readable medium described herein, the control signaling may be received in a radio resource control message, a medium access control control element, a downlink control information message, or any combination thereof.

A method for wireless communications at a base station is described. The method may include transmitting, to a UE, control signaling indicating an activation of a beam failure detection procedure for detecting beam failure on a per-beam basis for a set of beams, transmitting a set of reference signals via the set of beams, and receiving signaling indicating a beam failure recovery procedure at the UE for a first beam of the set of beams based on indicating the activation of the beam failure detection procedure.

An apparatus for wireless communications at a base station is described. The apparatus may include a processor, memory coupled with the processor, and instructions stored in the memory. The instructions may be executable by the processor to cause the apparatus to transmit, to a UE, control signaling indicating an activation of a beam failure detection procedure for detecting beam failure on a per-beam basis for a set of beams, transmit a set of reference signals via the set of beams, and receive signaling indicating a beam failure recovery procedure at the UE for a first beam of the set of beams based on indicating the activation of the beam failure detection procedure.

Another apparatus for wireless communications at a base station is described. The apparatus may include means for transmitting, to a UE, control signaling indicating an activation of a beam failure detection procedure for detecting beam failure on a per-beam basis for a set of beams, means for transmitting a set of reference signals via the set of beams, and means for receiving signaling indicating a beam failure recovery procedure at the UE for a first beam of the set of beams based on indicating the activation of the beam failure detection procedure.

A non-transitory computer-readable medium storing code for wireless communications at a base station is described. The code may include instructions executable by a processor to transmit, to a UE, control signaling indicating an activation of a beam failure detection procedure for detecting beam failure on a per-beam basis for a set of beams, transmit a set of reference signals via the set of beams, and receive signaling indicating a beam failure recovery procedure at the UE for a first beam of the set of beams based on indicating the activation of the beam failure detection procedure.

Some examples of the method, apparatuses, and non-transitory computer-readable medium described herein may further include operations, features, means, or instructions for transmitting, to the UE, control signaling indicating beam failure detection parameters for each beam of the set of beams, where receiving the signaling indicating the beam failure recovery procedure for the first beam may be based on a first set of beam failure detection parameters for the first beam.

In some examples of the method, apparatuses, and non-transitory computer-readable medium described herein, the beam failure detection procedure for detecting beam failure on a per-beam basis may be based on the beam failure detection parameters for each beam of the set of beams.

In some examples of the method, apparatuses, and non-transitory computer-readable medium described herein, the beam failure detection parameters include a beam failure detection timer duration, a beam failure count threshold, or both, for each beam of the set of beams.

Some examples of the method, apparatuses, and non-transitory computer-readable medium described herein may further include operations, features, means, or instructions for transmitting, to the UE, control signaling indicating selected beam failure detection parameters corresponding to one or more beams of the set of beams, where receiving the signaling indicating the beam failure recovery procedure for the first beam may be based on a first selected beam failure detection parameter for the first beam.

Some examples of the method, apparatuses, and non-transitory computer-readable medium described herein may further include operations, features, means, or instructions for receiving, from the UE, a request to change one or more beam failure detection parameters, where the where the control signaling indicating the selected beam failure detection parameters may be transmitted based on receiving the request.

Some examples of the method, apparatuses, and non-transitory computer-readable medium described herein may further include operations, features, means, or instructions for transmitting, to the UE, control signaling indicating a beamforming configuration based on receiving the signaling indicating the beam failure recovery procedure for the first beam and communicating with the UE via the second beam and a third beam in accordance with the beamforming configuration.

In some examples of the method, apparatuses, and non-transitory computer-readable medium described herein, the signaling indicating the beam failure recovery procedure identifies one or more candidate beams.

Some examples of the method, apparatuses, and non-transitory computer-readable medium described herein may further include operations, features, means, or instructions for receiving signaling indicating a second beam failure recovery procedure for the second beam at the UE based on indicating the activation of the beam failure detection procedure.

In some examples of the method, apparatuses, and non-transitory computer-readable medium described herein, the set of reference signals includes a channel state information reference signal, a synchronization signal block, or both.

In some examples of the method, apparatuses, and non-transitory computer-readable medium described herein, the control signaling may be transmitted in a radio resource control message, a medium access control control element, a downlink control information message, or any combination thereof.

DETAILED DESCRIPTION

Figure 1:
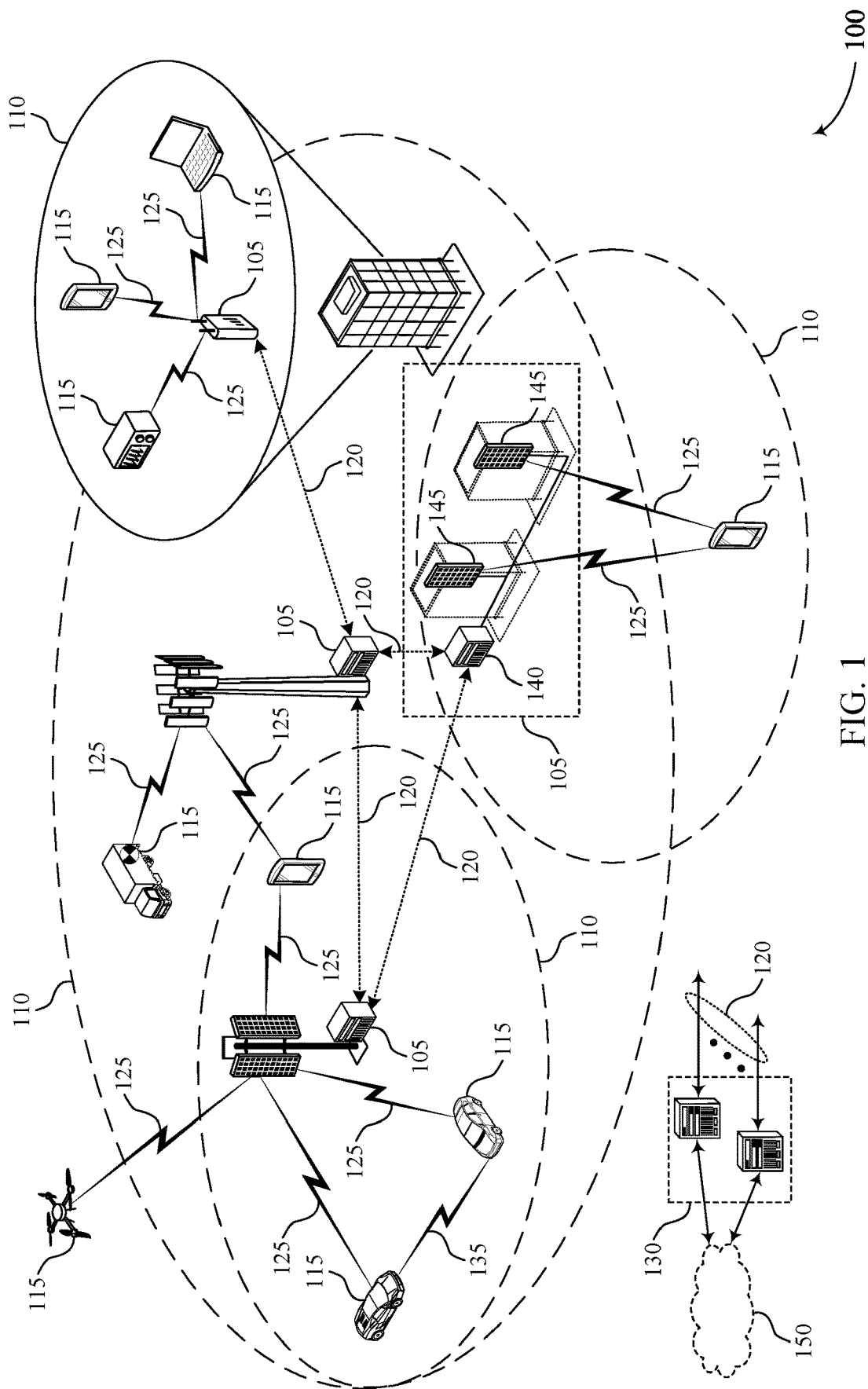
FIG. 1 illustrates an example of a wireless communications system that supports techniques for individual beam failure detection in accordance with aspects of the present disclosure.

In a wireless communications system, a base station and a user equipment (UE) may communicate using one or more beams in millimeter wave (mmW) frequency ranges, e.g., from 25 gigahertz (GHz) to 300 GHz. Wireless communication at these frequencies may be associated with increased signal attenuation (e.g., pathloss), which may be influenced by various factors, such as temperature, barometric pressure, diffraction, etc. Accordingly, transmissions in these frequency ranges may be impeded by physical obstructions (e.g., trees, moving cars, buildings, etc.), or interference with other transmission at this frequency which may result in one or more beam failures.

As such, a base station and UE may operate in accordance with a multiple beam failure detection (BFD) procedure. For example, the base station may transmit to the UE respective BFD reference signals (BFD-RSs) via one or more associated beams. The UE may use the one or more BFD-RSs to estimate a respective block error rate (BLER) associated with each beam such that if the BLER for every beam is greater than a configured threshold, a physical (PHY) layer at the UE may indicate a beam failure indication (BFI) to a medium access control (MAC) layer. Based on the BFI, the MAC layer may begin a BFD timer such that if the number of BFIs indicated by the PHY layer is greater than a threshold before the timer expires, the UE may transmit an indication of a beam failure to the base station. However, indicating a BFI to the MAC layer when every configured beam has a BLER above the configured threshold may reduce communications reliability. For example, the UE may not report a beam failure for an individual beam that has a high BLER, which may reduce the reliability of the individual beam.

According to the techniques described herein, the base station and the UE may enact an individual BFD procedure on a per beam basis. As such, if the PHY layer indicates to the MAC layer one or more BFIs for a first beam such that the total number of BFIs is greater than the configured BFI counting threshold before the configured BFD timer expires, the UE may indicate to the base station a beam failure for the first beam. In some examples, the base station may configure the UE with a respective BFD timer (e.g., $T\_i$) and a respective BFI counting threshold (e.g., $maxCount\_i$) for each beam. In some examples, if multiple parameter values are configured, the base station may switch parameter values corresponding to the one or more beams using a MAC control element (MAC-CE) or downlink control information (DCI). Additionally or alternatively, the UE may transmit a request to the base station to switch parameter values using a MAC-CE or using uplink control information (UCI). By indicating a beam failure on a per beam basis, the UE may benefit from a faster and more accurate reaction to varying wireless channel conditions and improved service consistency. In some examples, the UE may be able to distinguish beam failure due to interference or noise, and avoid beam switching requests due to temporary or inaccurate channel condition estimation.

Aspects of the disclosure are initially described in the context of wireless communications systems, a transmission scheme, and a process flow. Aspects of the disclosure are further illustrated by and described with reference to apparatus diagrams, system diagrams, and flowcharts that relate to techniques for individual BFD.

FIG. 1 illustrates an example of a wireless communications system 100 that supports techniques for individual BFD in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/$ $(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the PHY layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 and UE 115 may enact an individual BFD procedure on a per beam basis. For example, the base station 105 may transmit to the UE respective BFD-RSs via one or more associated beams. The UE 115 may use the one or more BFD-RSs to estimate a respective BLER associated with each beam such that if the BLER for a beam is greater than a configured threshold, a protocol layer (e.g., a lower layer such as a PHY layer) at the UE 115 may indicate a BFI for the beam to another protocol layer (e.g., a higher layer such as a MAC layer). As such, if a PHY layer at the UE 115 indicates to the MAC layer one or more BFIs for a first beam such that the total number of BFIs is greater than a configured BFI counting threshold during a configured BFD timer, the UE 115 may indicate to the base station 105 a beam failure for the first beam. In some examples, the base station 105 may configure the UE 115 with a respective BFD timer and a respective BFI counting threshold for each beam. In some examples, if multiple parameter values are configured, the base station 105 may switch parameter values corresponding to the one or more beams using MAC-CE or DCI. Additionally or alternatively, the UE 115 may transmit a request to the base station 105 to switch parameter values using a MAC-CE or using UCI.

By indicating a beam failure on a per beam basis, the UE 115 may benefit from a faster and more accurate reaction to varying wireless channel conditions and improved service consistency. In some examples, the UE 115 may be able to distinguish beam failure due to interference or noise, and avoid beam switching requests due to temporary or inaccurate channel condition estimation.

Figure 2:
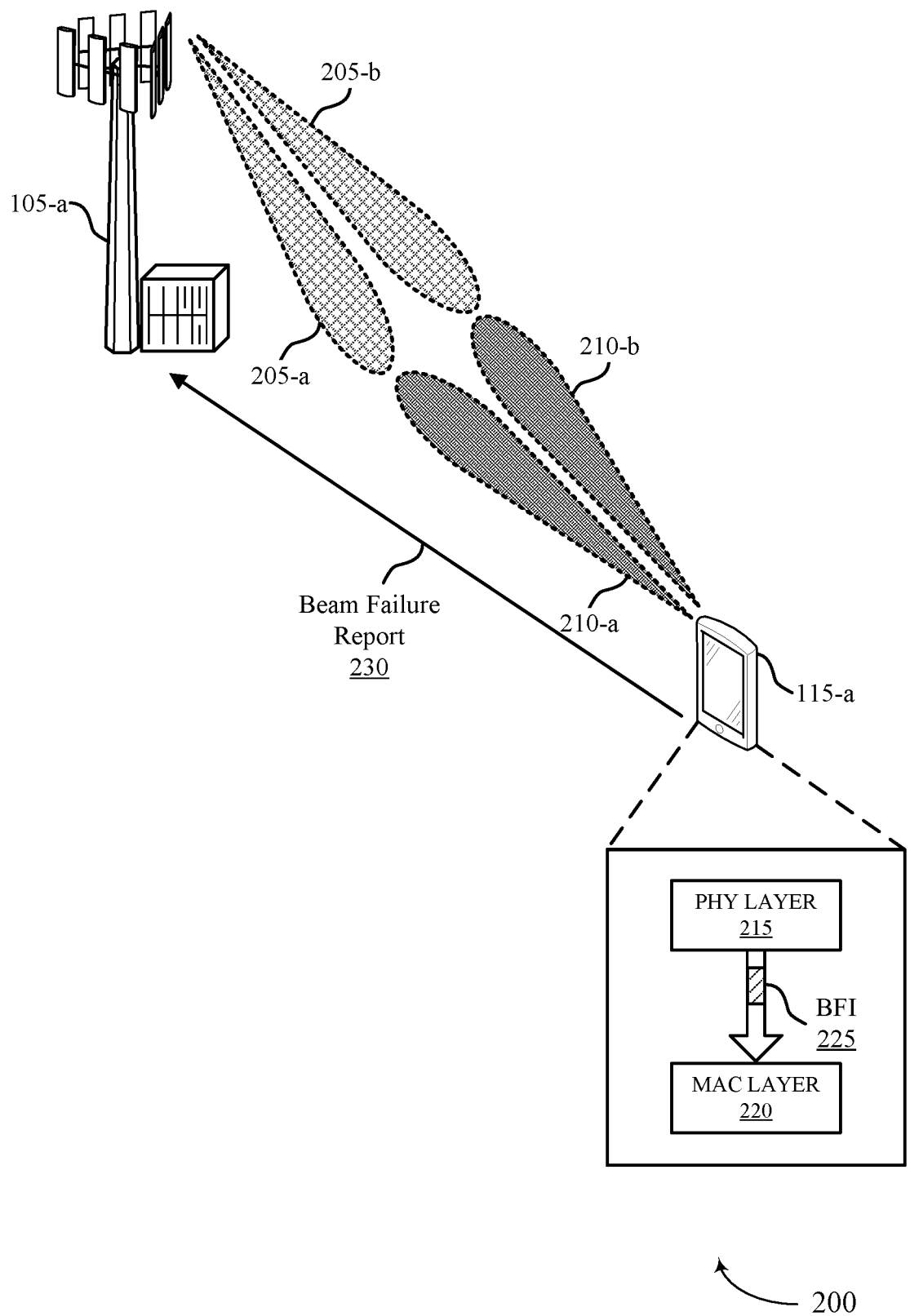
FIG. 2 illustrates an example of a wireless communications system that supports techniques for individual beam failure detection in accordance with aspects of the present disclosure.

FIG. 2 illustrates an example of a wireless communications system 200 that supports techniques for individual BFD in accordance with aspects of the present disclosure. In some examples, the wireless communications system 200 may implement aspects of the wireless communications system 100. For example, the wireless communications system 200 may include a base station 105-*a* and a UE 115-*a*, which may be examples of the corresponding devices described with reference to FIG. 1. The wireless communications system 200 may include features for improved BFD procedures between the UE 115-*a* and the base station 105-*a*. For example, the UE 115-*a* and the base station 105-*a* may operate in accordance with an individual BFD procedure for multiple beams that the wireless devices may use for wireless communication, such as UE beams 210 or base station beams 205.

The base station 105-*a* may communicate with the UE 115-*a* using beamforming techniques. The base station 105-*a* may transmit control signaling to the UE 115-*a* to initialize a beam sweep procedure, in which the base station 105-*a* and the UE 115-*a* may identify one or more base station beams 205 and one or more UE beams 210 for beamformed communications based on the beam sweep procedure. For example, the base station 105-*a* and the UE 115-*a* may select base station beams 205-*a* and 205-*b* from a set of base station beams 205 based on the beam sweep procedure. Similarly, the base station 105-*a* and the UE 115-*a* may select UE beams 210-*a* and 210-*b* from a set of UE beams 210 based on the beam sweep procedure.

Individual base station beams 205 may correspond to individual UE beams 210 for communications in the wireless communications system 200. In some examples, the communications illustrated in FIG. 2 may include downlink transmissions to the UE 115-*a*, in which the base station beams 205 may be transmission beams and the UE beams 210 may be reception beams. Additionally or alternatively, the communications illustrated in FIG. 2 may include uplink transmissions from the UE 115-*a*, in which the base station beams 205 may be reception beams and the UE beams 210 may be transmission beams.

In some cases, the base station 105-*a* may transmit, to the UE 115-*a*, a periodic BFD-RS on a base station beam 205 (e.g., the base station beam 205-*a*) which the UE 115-*a* may receive on the associated UE beam 210 (e.g., the UE beam 210-*a*). In some examples, the UE 115-*a* may monitor for the periodic BFD-RS and determine various channel qualities associated with the UE beam 210. For instance, the BFD-RS may be an example of a CSI-RS or a synchronization signal block (SSB) which may both be used to estimate various qualities for the associated UE beam 210. In some examples, the UE 115-*a* may calculate a BLER of the received BFD-RS. For example, the UE 115-*a* may compare the received contents of the BFD-RS to expected contents of the BFD-RS to estimate the BLER associated with the received BFD-RS for the downlink occasion.

In some cases, the base station 105-*a* may configure the UE 115-*a* with a BLER threshold value (e.g., BLER_threshold) that the UE 115-*a* may compare to the estimated BLER for the received BFD-RS. If for a given downlink occasion the estimated BLER for the BFD-RS is greater than the configured BLER threshold (e.g., estimated_BLER>BLER_threshold), the UE 115-*a* may generate a BFI 225 for the UE beam 210 at a lower layer (e.g., a PHY layer 215) of the UE 115-*a*. The UE 115-*a* may indicate the generated BFI 225 to a higher layer at the UE 115-*a* (e.g., a MAC layer 220).

Based on the BFI 225, the MAC layer 220 may start a BFD timer and a BFI count for the beam associated with the received BFI 225. In some examples, the MAC layer 220 may increment a BFI counter for every BFI 225 the MAC layer 220 receives for the associated beam. In some examples, the base station 105-*a* may configure the MAC layer 220 with a BFI count threshold (e.g., maxCount) such that if the BFI counter satisfies the maxCount before the BFD timer expires, the UE 115-*a* may transmit to the base station 105-*a* a beam failure report 230 for the UE beam 210 associated with the BFI count. In some examples, the beam failure report 230 may include a beam failure recovery request.

To minimize inconsistencies for the service quality among multiple beam connections, the base station 105-*a* and UE 115-*a* may operate in accordance with an individual BFD procedure. For example, each UE beam 210 may have associated parameters for identifying a beam failure (e.g., respective BLER thresholds, BFD timers, maximum BFI counts, etc.). In some examples, the parameters may be the same across all UE beams 210 or may be unique to the individual UE beams 210. As such, a BFI 225 may be generated for a UE beam 210 (e.g., the UE beam 210-*a*) based on the estimated BLER for a BFD-RS received via the UE beam 210. For example, if during a first downlink occasion a first BFD-RS has an estimated BLER greater than an associated BLER threshold and a second BFD-RS has an estimated BLER less than an associated BLER threshold, the PHY layer 215 may indicate to the MAC layer 220 a BFI 225 associated with the first BFD-RS and the MAC layer 220 may start an associated BFD timer (e.g., T_1) and increment an associated BFI count (e.g., BFI_count_1). If during a second downlink occasion both the first and the second BFD-RSs have estimated BLERs greater than respective BLER thresholds, the PHY layer 215 may indicate respective BFIs 225 for each BFD-RS, and the MAC layer 220 may increment the BFI_count_1 and start a BFD timer (e.g., T_2) and BFI count (e.g., BFI_count_2) associated with the second BFD-RS. If either BFI_count_1 or BFI_count_2 satisfies a respective BFI count threshold (e.g., maxCount_1 and maxCount 2 respectively) the UE 115-*a* may determine a beam failure and transmit to the base station 105-*a* a beam failure report 230, which may include an indication that the UE 115-*a* is initiating a beam failure recovery procedure. In some examples, the beam failure report 230 may include a beam failure recovery request.

By operating in accordance with the individual BFD procedure described herein, the UE 115-*a* may realize one or more benefits. For example, the UE 115-*a* may experience a more secure and accurate BFD procedure. The UE 115-*a* may also benefit from including more specific information in the beam failure report 230. For example, the UE 115-*a* may include in the beam failure report 230 an indication of one or more UE beams 210 among a suggested set of UE beams 210 and the base station 105-*a* may choose a new UE beam 210 based on the indication. The base station 105-*a* and UE 115-*a* may also benefit from faster and more accurate reaction to varying wireless channel conditions, a more consistent beam service (e.g., service may be more reliable on a per beam basis), distinguish between different causes for a beam failure (e.g., due to interference or due to noise), and avoid beam switching requests due to temporary interference or inaccurate channel condition estimation.

Figure 3:
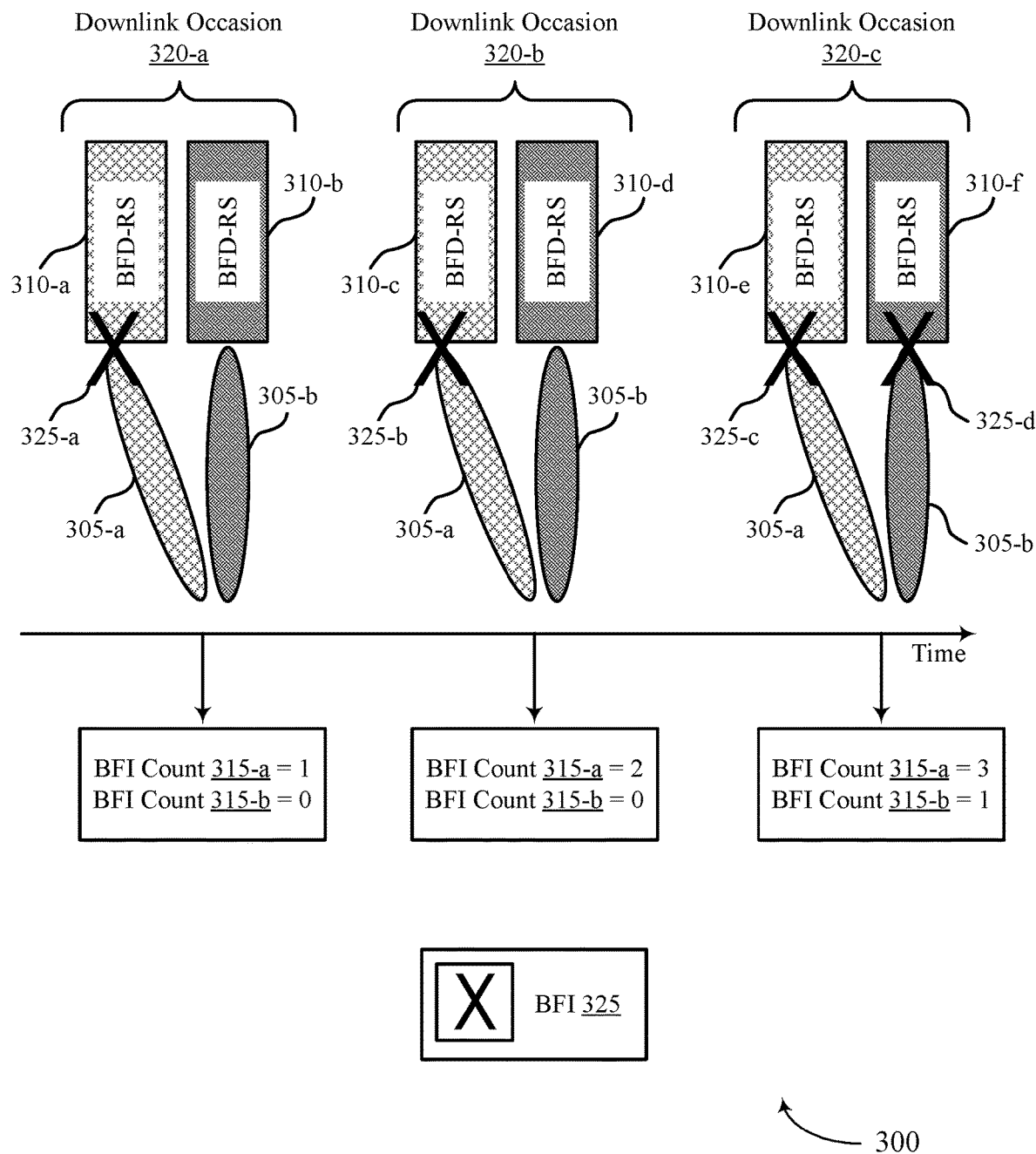
FIG. 3 illustrates an example of a transmission scheme that supports techniques for individual beam failure detection in accordance with aspects of the present disclosure.

FIG. 3 illustrates an example of a transmission scheme 300 that supports techniques for individual BFD in accordance with aspects of the present disclosure. In some examples, the transmission scheme 300 may implement or be implemented by aspects of the wireless communications system 100 and the wireless communications system 200. For example, the transmission scheme 300 may be an example of a UE receiving one or more BFD-RSs 310 from a base station via one or more beams 305. The base station and the UE may be examples of the corresponding devices described with reference to FIGS. 1 and 2. The transmission scheme 300 may include features for improved BFD procedures between the UE and the base station. While the transmission scheme 300 illustrates communication over two beams 305, the base station and the UE may communicate with one another over any number of beams 305.

In some examples, the base station may activate or deactivate a mode for the individual BFD procedure. For example, the base station may transmit a configuration message indicating activation of the mode to the UE, configuring the UE to perform an individual BFD procedure for each beam 305, and may at another occasion transmit a configuration message indicating deactivation of the mode. The base station may transmit the message configuring activation or deactivation of the mode via a MAC-CE or a DCI message. In some examples, the UE may transmit signaling to the base station requesting activation or deactivation of the mode. For example, the UE may transmit the request via a MAC-CE or a UCI message.

As illustrated in FIG. 3, the UE may receive, from the base station, one or more BFD-RSs 310 during one or more downlink occasions 320. For example, during a downlink occasion 320-*a*, the UE may receive a BFD-RS 310-*a* using a beam 305-*a* and may receive a BFD-RS 310-*b* using a beam 305-*b*. In some examples, the UE may estimate a respective BLER for each of the received BFD-RS 310-*a* and BFD-RS 310-*b*.

In some examples, the base station may configure a BLER threshold (e.g., BLER_threshold) for each BFD-RS 310 such that if the estimated BLER for a BFD-RS 310 satisfies (e.g., is greater than) the BLER threshold, a PHY layer at the UE may record BFI 325 for the beam 305 associated with the BFD-RS 310. For example, during downlink occasion 320-*a*, the PHY layer may record a BFI 325-*a* for the beam 305-*a* based on the BFD-RS 310-*a* having an estimated BLER greater than its respective BLER threshold and the PHY layer may refrain from recording a BFI 325 for beam 305-*b* based on the BFD-RS 310-*b* having an estimated BLER less than its respective BLER threshold. The PHY layer may report or indicate BFI 325-*a* for beam 305-*a* to a MAC layer at the UE. Upon reception of the BFI 325-*a*, the MAC layer may start a BFD timer (e.g., T_a) and a BFI count 315-*a* that is associated with the beam 305-*a*. As illustrated in FIG. 3, the MAC layer may increment the BFI count 315-*a* to one to indicate a first BFI 325-*a* for beam 305-*a* during the BFD timer T_a.

In the example of downlink occasion 320-*b*, the UE may receive BFD-RS 310-*c* and BFD-RS 310-*d* on the beam 305-*a* and the beam 305-*b* respectively. The UE may estimate the BLER for BFD-RS 310-*c* and for BFD-RS 310-*d* and compare each BLER to its respective BLER threshold. For example, during downlink occasion 320-*b*, the PHY layer may record a BFI 325-*b* for beam 305-*a* based on the BFD-RS 310-*a* having an estimated BLER greater than its respective BLER threshold and the PHY layer may refrain from recording a BFI 325 for beam 305-*b* based on the BFD-RS 310-*b* having an estimated BLER less than its respective BLER threshold. The PHY layer may report BFI 325-*b* for beam 305-*a* to the MAC layer. Upon reception of the BFI 325-*b*, the MAC layer may increment the BFI count 315-*a* to two indicating the second BFI 325 for beam 305-*a* during the BFD timer T_a.

In the example of downlink occasion 320-*c*, the UE may receive BFD-RS 310-*e* and BFD-RS 310-*f* on the beam 305-*a* and the beam 305-*b* respectively. The UE may estimate the BLER for BFD-RS 310-*e* and BFD-RS 310-*f* and compare each BLER to its respective BLER threshold. For example, during downlink occasion 320-*c*, the PHY layer may record a BFI 325-*c* for beam 305-*a* and a BFI 325-*d* for beam 305-*b* based on both BFD-RS 310-*e* and BFD-RS 310-*e* having an estimated BLER greater than its respective BLER thresholds. As such the PHY layer may report BFI 325-*c* for beam 305-*a* and BFI 325-*d* for beam 305-*b* to the MAC layer. Upon reception of the BFIs 325, the MAC layer may increment the BFI count 315-*a* to three indicating the third BFI 325 for beam 305-*a* during its configured timer T_a. The MAC layer may also start a BFD timer (e.g., T_b) and a BFI count 315-*b* that is associated with beam 305-*b* and increment the BFI count 315-*b* to one indicating the first BFI 325 for beam 305-*a* during its configured timer T_b.

In some cases, the base station may configure a BFI count threshold (e.g., maxCount) for each beam 305 such that if a BFI count 315 associated with a beam 305 exceeds the threshold, the UE may transmit a beam failure report to the base station for the beam 305. For example, if the beam 305-*a* has an associated BFI count threshold (e.g., max-Count_a) of three, the MAC layer may transmit a beam failure report for beam 305-*a* based on the BFI count 315-*a* satisfying maxCount_a during the downlink occasion 320-*c*. The beam failure report may include an indication that the UE is performing a beam failure recovery procedure. In some examples, the beam failure report may include a beam failure recovery request. In some examples, the UE may transmit the beam failure report for beam 305-*a* on another beam 305 (e.g., beam 305-*b*). In some examples, the base station may receive the beam failure report and transmit control signaling (e.g., DCI) to the UE which may indicate changes to the parameters of beam 305-*a* (e.g., a change in directionality or a change in frequency resources). In some cases, for a given beam 305, a BFI count 315 may not satisfy the associated maxCount before the BFD timer expires. In such cases, the MAC layer may reset the BFI count 315 and restart the BFD timer upon receiving another BFI 325 for the associated beam 305.

In some examples, the base station may also configure parameters which the UE may use for the individual BFD procedures. For example, the base station may configure the UE with a respective BFD timer (e.g., T_i) and a respective BFI counting threshold (e.g., maxCount_i) for each beam 305. In some examples, the parameters may be the same for each beam 305 of the set of beams 305. In some other examples, the base station may configure each beam 305 with a different set of parameters based on characteristics of the beam 305. For example, the beam 305-*a* may be an example of a primary beam and may have a higher associated priority compared to the beam 305-*b*, which may be an example of a secondary beam, and as such the base station may configure the beam 305-*a* and the beam 305-*b* with different sets of parameters. In some examples, the base station may configure the set of parameters for each beam 305 using an RRC configuration. In some cases, the base station may switch parameter values corresponding to a beam 305 by transmitting a MAC-CE or DCI message to the UE. Additionally or alternatively, the UE may request that the base station switch parameter values corresponding to a beam 305 by transmitting a MAC-CE or UCI message to the base station.

By indicating a beam failure on a per beam basis, the UE may benefit from a faster and more accurate reaction to varying wireless channel conditions and improved service consistency. In some examples, the UE may be able to distinguish beam failure due to interference or noise, and avoid beam switching requests due to temporary or inaccurate channel condition estimation.

Figure 4:
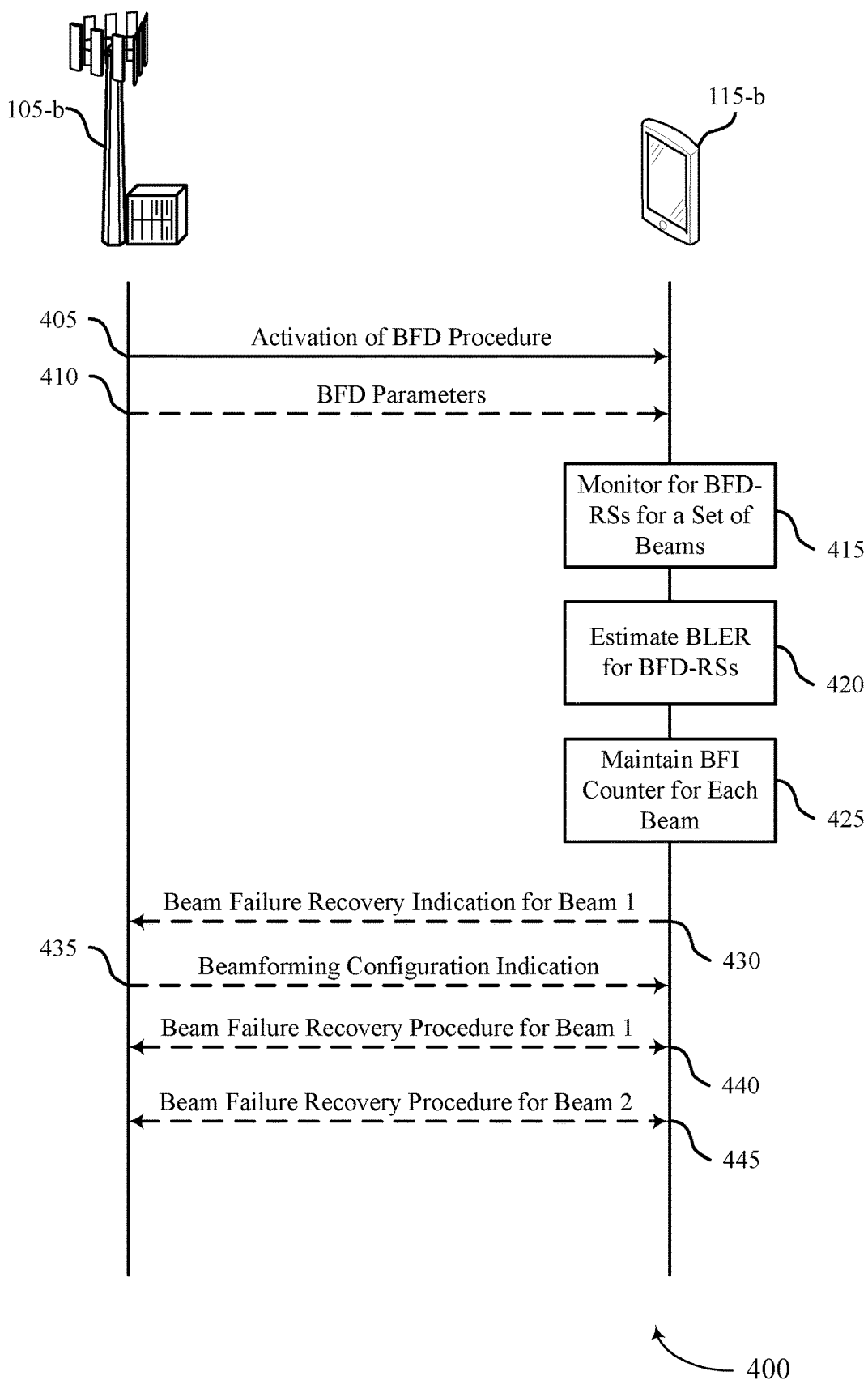
FIG. 4 illustrates an example of a process flow that supports techniques for individual beam failure detection in accordance with aspects of the present disclosure.

FIG. 4 illustrates an example of a process flow 400 that supports techniques for individual BFD in accordance with aspects of the present disclosure. In some examples, process flow 400 may implement aspects of wireless communications system 100, wireless communications system 200, or a combination thereof. Process flow 400 may illustrate operations between a UE 115-*b* and a base station 105-*b*, which may be examples of corresponding devices described with reference to FIGS. 1 and 2. Alternative examples of the following may be implemented, where some steps are performed in a different order than described or are not performed at all. In some cases, steps may include additional features not mentioned below, or further steps may be added. In addition, while process flow 400 shows processes between a single base station 105-*b* and UE 115-*b*, it should be understood that these processes may occur between any number of network devices.

At 405, the UE 115-*b* may receive, from a base station 105-*b*, control signaling indicating an activation of a BFD procedure for detecting beam failure on a per-beam basis for a set of beams.

At 410, the UE 115-*b* may receive, from the base station 105-*b*, control signaling indicating BFD parameters for each beam of the set of beams, in which performing a beam failure recovery procedure for a first beam is based on a first set of BFD parameters for the first beam. The control signaling may be received in RRC message, a MAC-CE, a DCI message, or any combination thereof. In some examples, the BFD procedure for detecting beam failure on a per-beam basis may be based on the BFD parameters for each beam of the set of beams. In some examples, the BFD parameters may include a BFD timer duration, a beam failure count threshold, or both, for each beam of the set of beams. In some examples, the UE 115-*b* may receive, from the base station 105-*b*, control signaling indicating selected BFD parameters corresponding to one or more beams of the set of beams, in which performing the beam failure recovery procedure for the first beam may be based on a first selected BFD parameter for the first beam. In such examples, the BFD procedure may be based on the selected BFD parameters. In some examples, the UE 115-*b* may transmit, to the base station 105-*b*, a request to change one or more of the BFD parameters, in which case the control signaling indicating the selected BFD parameters may be received based on transmitting the request.

At 415, the UE 115-*b* may monitor for a set of reference signals via the set of beams. A reference signal may be an example of a BFD-RS which may be examples of a CSI-RS, an SSB, or both. At 420, the UE 115-*b* may determine a BLER associated with each of the BFD-RSs. At 425, the UE 115-*b* may maintain, at a first protocol layer of the UE 115-*b*, a separate BFI counter for each beam of the set of beams based on BFIs obtained from a second protocol layer of the UE 115-*b* on a per-beam basis. In some examples, the BFIs obtained from the second protocol layer may be based on the BLER satisfying a BLER threshold for one or more beams of the set of beams. The UE 115-*b* may increment, at the first protocol layer, the separate BFI counter for each beam of the set of beams based on obtaining BFIs from the second protocol layer on a per-beam basis, in which performing the beam failure recovery procedure for the first beam may be based on the first BFI counter satisfying a count threshold. The UE 115-*b* may also activate, at the first protocol layer, a separate BFD timer for each beam of the set of beams based on obtaining BFIs from the second protocol layer on a per-beam basis, in which performing the beam failure recovery procedure for the first beam may be based on a quantity of BFIs obtained for the first beam before a BFD timer for the first beam expires. In some cases, the first protocol layer may be a MAC layer and the second protocol layer may be a PHY layer.

At 430, the UE 115-*b* may transmit, to the base station 105-*b*, signaling indicating the beam failure recovery procedure for the first beam based on the BFI count for the first beam. In some examples, the signaling indicating the beam failure recovery procedure for the first beam may identify one or more candidate beams. In some examples, the signaling may include a beam failure recovery request. At 435, the UE 115-*b* may receive, from the base station 105-*b*, control signaling indicating a beamforming configuration based on the signaling indicating the beam failure recovery procedure for the first beam. For example, the base station 105-*b* may indicate a beam switch and allocate a new beam to the UE 115-*b* using a DCI or MAC-CE. The UE 115-*b* may communicate with the base station 105-*b* in accordance with the beamforming configuration.

At 440, the UE 115-*b* and base station 105-*b* may perform a beam failure recovery procedure for a first beam of the set of beams based on the first beam failure indication counter for the first beam. At 445, the UE 115-*b* and base station 105-*b* may also perform a second beam failure recovery procedure for a second beam of the set of beams based on a second beam failure indication counter for the second beam.

Figure 5:
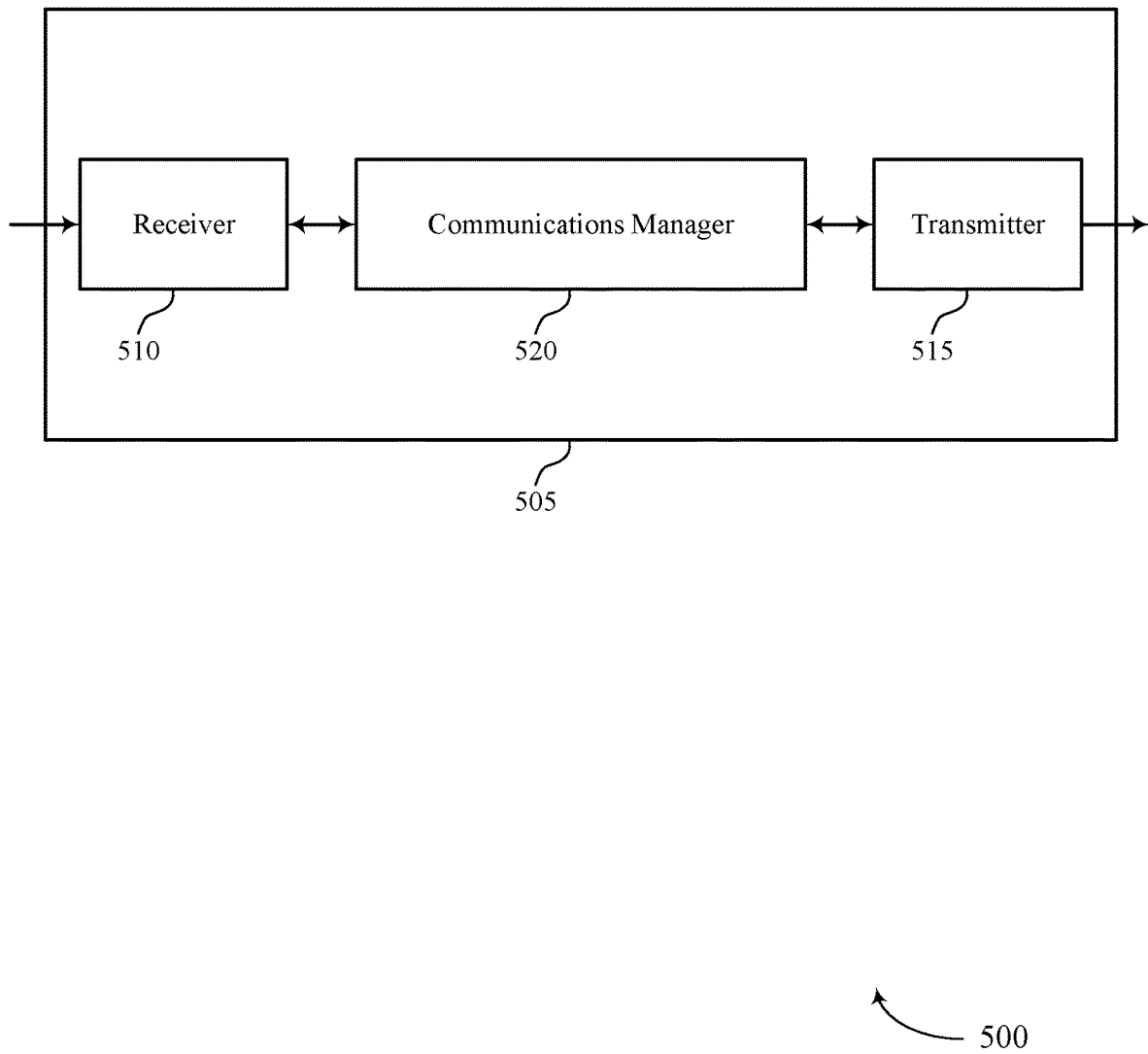
FIGS. 5 and 6 show block diagrams of devices that support techniques for individual beam failure detection in accordance with aspects of the present disclosure.

FIG. 5 shows a block diagram 500 of a device 505 that supports techniques for individual BFD in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for individual BFD). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for individual BFD). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for individual BFD as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, control signaling indicating an activation of a BFD procedure for detecting beam failure on a per-beam basis for a set of beams. The communications manager 520 may be configured as or otherwise support a means for monitoring for a set of reference signals via the set of beams. The communications manager 520 may be configured as or otherwise support a means for maintaining, at a first protocol layer of the UE, a separate beam failure indication counter for each beam of the set of beams based on beam failure indications obtained from a second protocol layer of the UE on a per-beam basis in accordance with the BFD procedure. The communications manager 520 may be configured as or otherwise support a means for performing a beam failure recovery procedure for a first beam of the set of beams based on a first beam failure indication counter for the first beam.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more consistent beam service, faster and more accurate reaction to varying wireless conditions, and a more efficient utilization of communication resources.

Figure 6:
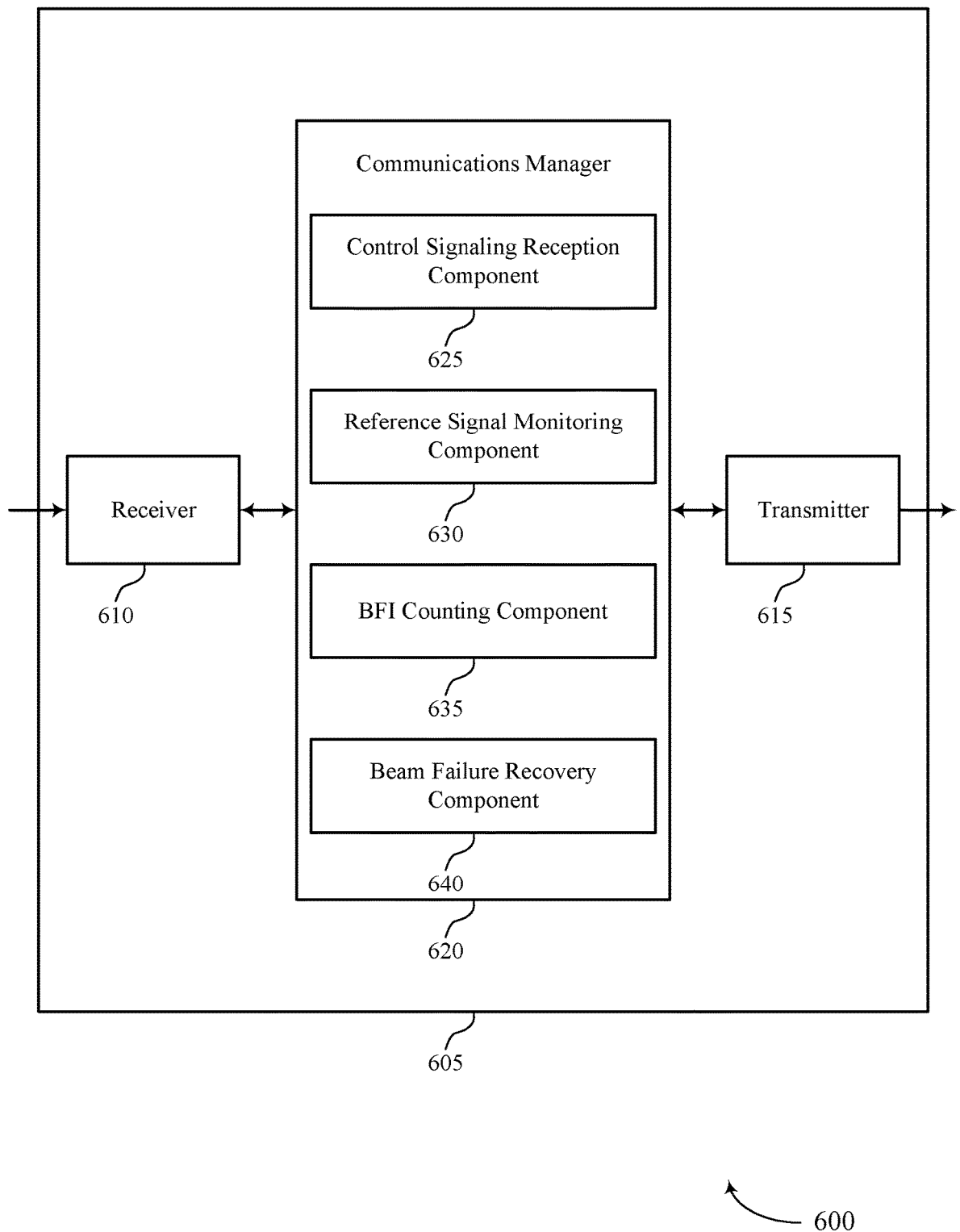

FIG. 6 shows a block diagram 600 of a device 605 that supports techniques for individual BFD in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for individual BFD).

Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for individual BFD). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for individual BFD as described herein. For example, the communications manager 620 may include a control signaling reception component 625, a reference signal monitoring component 630, a BFI counting component 635, a beam failure recovery component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The control signaling reception component 625 may be configured as or otherwise support a means for receiving, from a base station, control signaling indicating an activation of a BFD procedure for detecting beam failure on a per-beam basis for a set of beams. The reference signal monitoring component 630 may be configured as or otherwise support a means for monitoring for a set of reference signals via the set of beams. The BFI counting component 635 may be configured as or otherwise support a means for maintaining, at a first protocol layer of the UE, a separate beam failure indication counter for each beam of the set of beams based on beam failure indications obtained from a second protocol layer of the UE on a per-beam basis in accordance with the BFD procedure. The beam failure recovery component 640 may be configured as or otherwise support a means for performing a beam failure recovery procedure for a first beam of the set of beams based on a first beam failure indication counter for the first beam.

Figure 7:
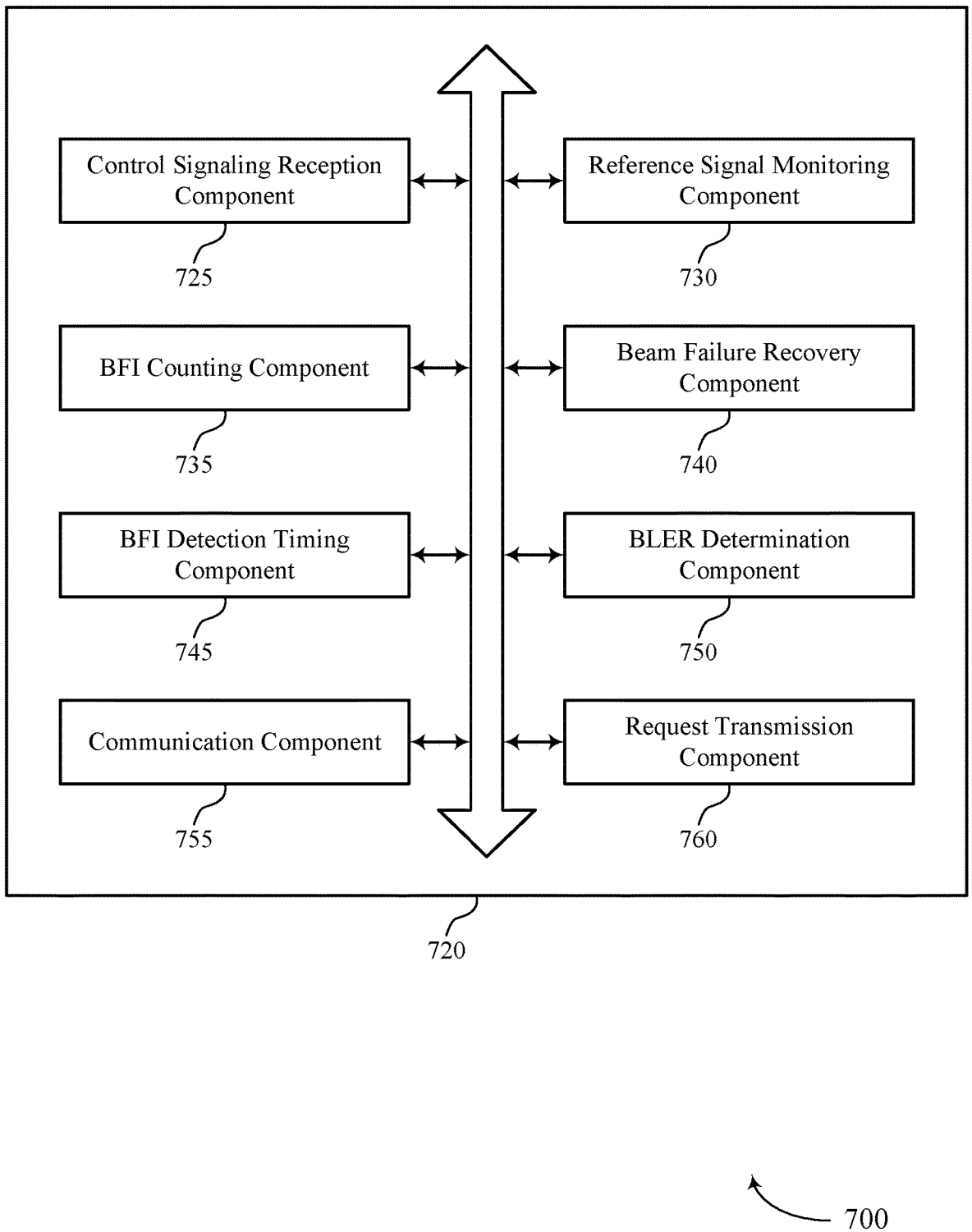
FIG. 7 shows a block diagram of a communications manager that supports techniques for individual beam failure detection in accordance with aspects of the present disclosure.

FIG. 7 shows a block diagram 700 of a communications manager 720 that supports techniques for individual BFD in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for individual BFD as described herein. For example, the communications manager 720 may include a control signaling reception component 725, a reference signal monitoring component 730, a BFI counting component 735, a beam failure recovery component 740, a BFI detection timing component 745, a BLER determination component 750, a communication component 755, a request transmission component 760, or any combination thereof. Each of these components may communicate, directly or indirectly, with one another (e.g., via one or more buses).

The communications manager 720 may support wireless communications at a UE in accordance with examples as disclosed herein. The control signaling reception component 725 may be configured as or otherwise support a means for receiving, from a base station, control signaling indicating an activation of a BFD procedure for detecting beam failure on a per-beam basis for a set of beams. The reference signal monitoring component 730 may be configured as or otherwise support a means for monitoring for a set of reference signals via the set of beams. The BFI counting component 735 may be configured as or otherwise support a means for maintaining, at a first protocol layer of the UE, a separate beam failure indication counter for each beam of the set of beams based on beam failure indications obtained from a second protocol layer of the UE on a per-beam basis in accordance with the BFD procedure. The beam failure recovery component 740 may be configured as or otherwise support a means for performing a beam failure recovery procedure for a first beam of the set of beams based on a first beam failure indication counter for the first beam.

In some examples, the control signaling reception component 725 may be configured as or otherwise support a means for receiving, from the base station, control signaling indicating BFD parameters for each beam of the set of beams, where performing the beam failure recovery procedure for the first beam is based on a first set of BFD parameters for the first beam.

In some examples, the BFD procedure for detecting beam failure on a per-beam basis is based on the BFD parameters for each beam of the set of beams.

In some examples, the BFD parameters include a BFD timer duration, a beam failure count threshold, or both, for each beam of the set of beams.

In some examples, the control signaling reception component 725 may be configured as or otherwise support a means for receiving, from the base station, control signaling indicating selected BFD parameters corresponding to one or more beams of the set of beams, where performing the beam failure recovery procedure for the first beam is based on a first selected BFD parameter for the first beam.

In some examples, the BFD procedure for detecting beam failure on a per-beam basis is based on the selected BFD parameters.

In some examples, the request transmission component 760 may be configured as or otherwise support a means for transmitting, to the base station, a request to change one or more BFD parameters, where the control signaling indicating the selected BFD parameters is received based on transmitting the request.

In some examples, to support maintaining the separate beam failure indication counter for each beam of the set of beams, the BFI counting component 735 may be configured as or otherwise support a means for incrementing, at the first protocol layer, the separate beam failure indication counter for each beam of the set of beams based on obtaining beam failure indications from the second protocol layer on a per-beam basis, where performing the beam failure recovery procedure for the first beam is based on the first beam failure indication counter satisfying a count threshold.

In some examples, to support maintaining the separate beam failure indication counter for each beam of the set of beams, the BFI detection timing component 745 may be configured as or otherwise support a means for activating, at the first protocol layer, a separate BFD timer for each beam of the set of beams based on obtaining beam failure indications from the second protocol layer on a per-beam basis, where performing the beam failure recovery procedure for the first beam is based on a quantity of beam failure indications obtained for the first beam before a BFD timer for the first beam expires.

In some examples, the beam failure recovery component 740 may be configured as or otherwise support a means for transmitting, to the base station, signaling indicating the beam failure recovery procedure for the first beam.

In some examples, the control signaling reception component 725 may be configured as or otherwise support a means for receiving, from the base station, control signaling indicating a beamforming configuration based on the signaling indicating the beam failure recovery procedure for the first beam. In some examples, the communication component 755 may be configured as or otherwise support a means for communicating with the base station in accordance with the beamforming configuration.

In some examples, the signaling indicating the beam failure recovery procedure for the first beam identifies one or more candidate beams.

In some examples, the beam failure recovery component 740 may be configured as or otherwise support a means for performing a second beam failure recovery procedure for a second beam of the set of beams based on a second beam failure indication counter for the second beam.

In some examples, the BLER determination component 750 may be configured as or otherwise support a means for determining a block error rate associated with the set of reference signals, where the beam failure indications obtained from the second protocol layer are based on the block error rate satisfying a block error rate threshold for one or more beams of the set of beams.

In some examples, the set of reference signals includes a channel state information reference signal, a synchronization signal block, or both.

In some examples, the first protocol layer includes a medium access control layer and the second protocol layer includes a physical layer.

In some examples, the control signaling is received in a radio resource control message, a medium access control control element, a downlink control information message, or any combination thereof.

Figure 8:
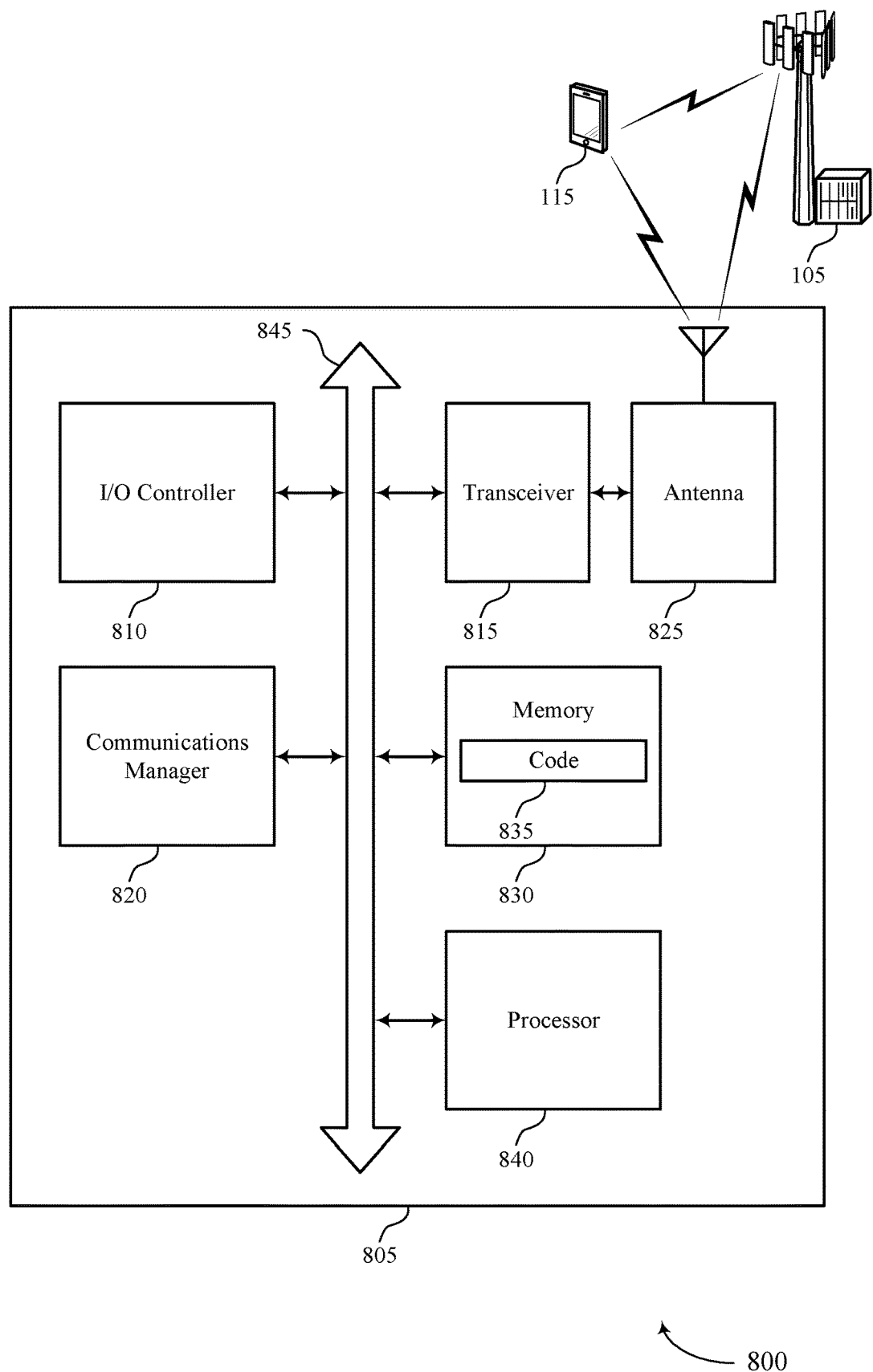
FIG. 8 shows a diagram of a system including a device that supports techniques for individual beam failure detection in accordance with aspects of the present disclosure.

FIG. 8 shows a diagram of a system 800 including a device 805 that supports techniques for individual BFD in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for individual BFD). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, control signaling indicating an activation of a BFD procedure for detecting beam failure on a per-beam basis for a set of beams. The communications manager 820 may be configured as or otherwise support a means for monitoring for a set of reference signals via the set of beams. The communications manager 820 may be configured as or otherwise support a means for maintaining, at a first protocol layer of the UE, a separate beam failure indication counter for each beam of the set of beams based on beam failure indications obtained from a second protocol layer of the UE on a per-beam basis in accordance with the BFD procedure. The communications manager 820 may be configured as or otherwise support a means for performing a beam failure recovery procedure for a first beam of the set of beams based on a first beam failure indication counter for the first beam.

By including or configuring the communications manager 820 in accordance with examples as described herein, the device 805 may support techniques for improved beam communication reliability, increased beam service consistency, improved user experience related to a faster and more accurate reaction to varying wireless channel conditions, more efficient utilization of communication resources, and improved beam failure recovery coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for individual BFD as described herein, or the processor 840 and the memory 830 may be otherwise configured to perform or support such operations.

Figure 9:
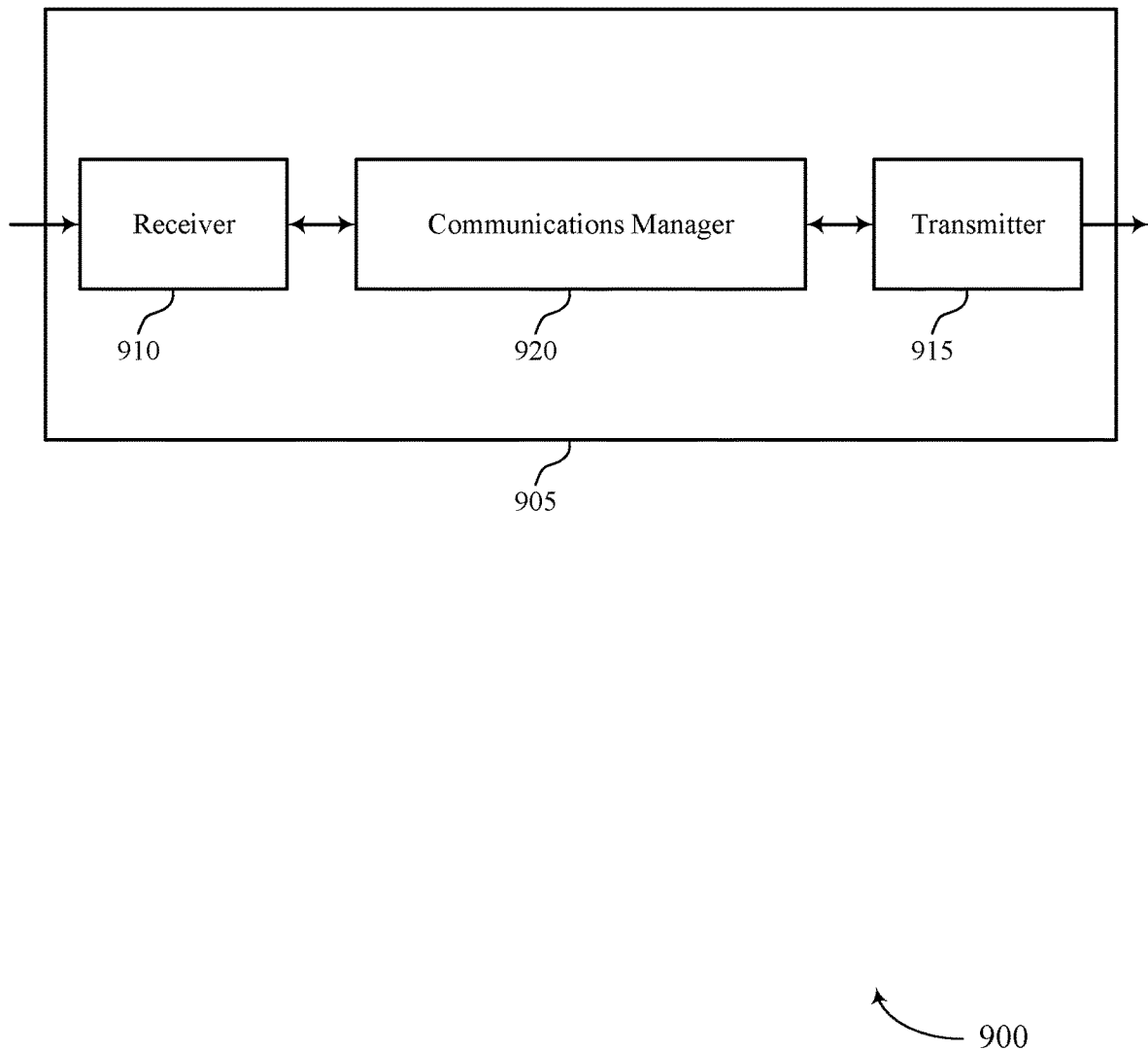
FIGS. 9 and 10 show block diagrams of devices that support techniques for individual beam failure detection in accordance with aspects of the present disclosure.

FIG. 9 shows a block diagram 900 of a device 905 that supports techniques for individual BFD in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for individual BFD). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for individual BFD). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for individual BFD as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, control signaling indicating an activation of a BFD procedure for detecting beam failure on a per-beam basis for a set of beams. The communications manager 920 may be configured as or otherwise support a means for transmitting a set of reference signals via the set of beams. The communications manager 920 may be configured as or otherwise support a means for receiving signaling indicating a beam failure recovery procedure at the UE for a first beam of the set of beams based on indicating the activation of the BFD procedure.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more consistent beam service, faster and more accurate reaction to varying wireless conditions, and a more efficient utilization of communication resources.

Figure 10:
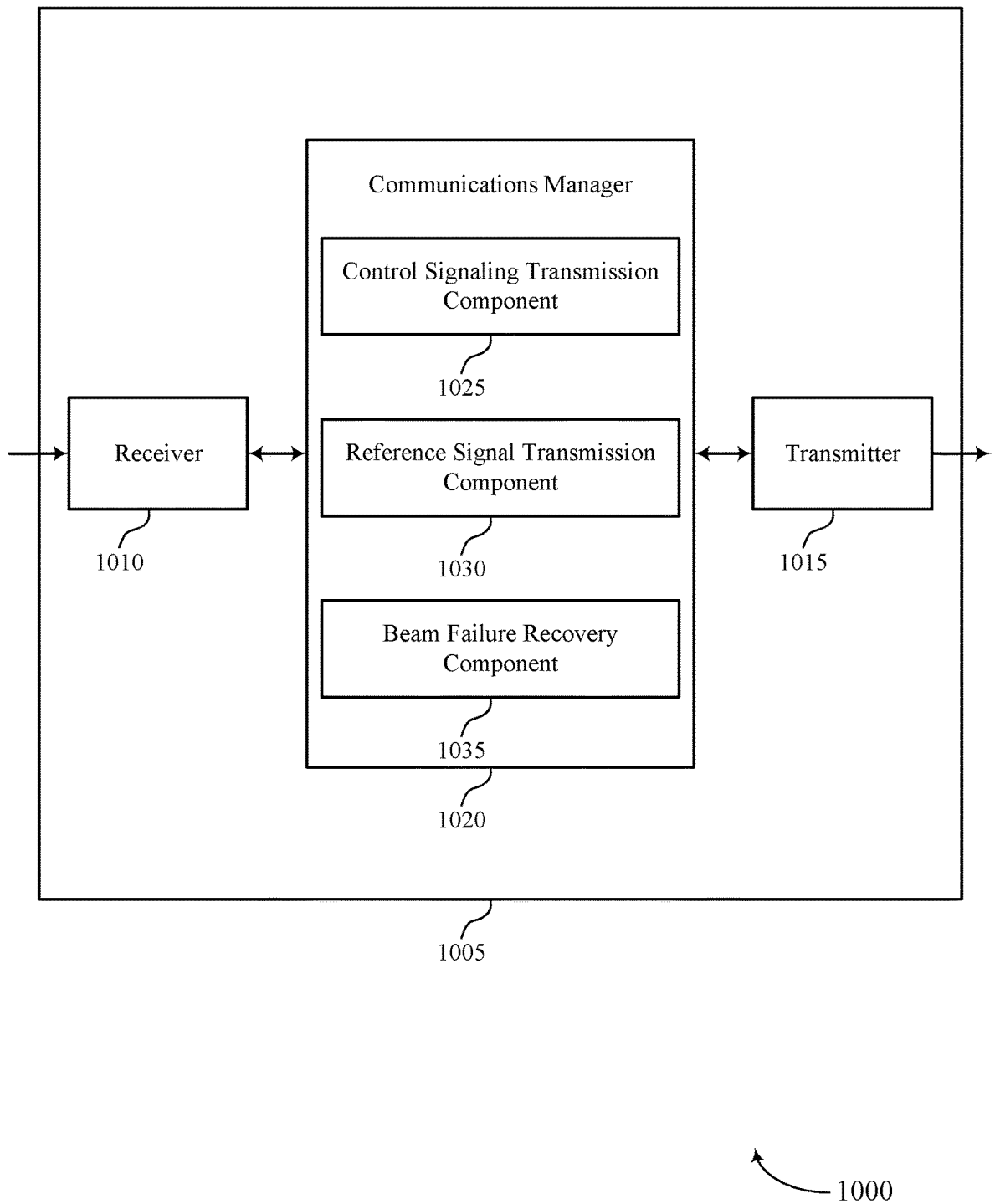

FIG. 10 shows a block diagram 1000 of a device 1005 that supports techniques for individual BFD in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for individual BFD). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for individual BFD). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for individual BFD as described herein. For example, the communications manager 1020 may include a control signaling transmission component 1025, a reference signal transmission component 1030, a beam failure recovery component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The control signaling transmission component 1025 may be configured as or otherwise support a means for transmitting, to a UE, control signaling indicating an activation of a BFD procedure for detecting beam failure on a per-beam basis for a set of beams. The reference signal transmission component 1030 may be configured as or otherwise support a means for transmitting a set of reference signals via the set of beams. The beam failure recovery component 1035 may be configured as or otherwise support a means for receiving signaling indicating a beam failure recovery procedure at the UE for a first beam of the set of beams based on indicating the activation of the BFD procedure.

Figure 11:
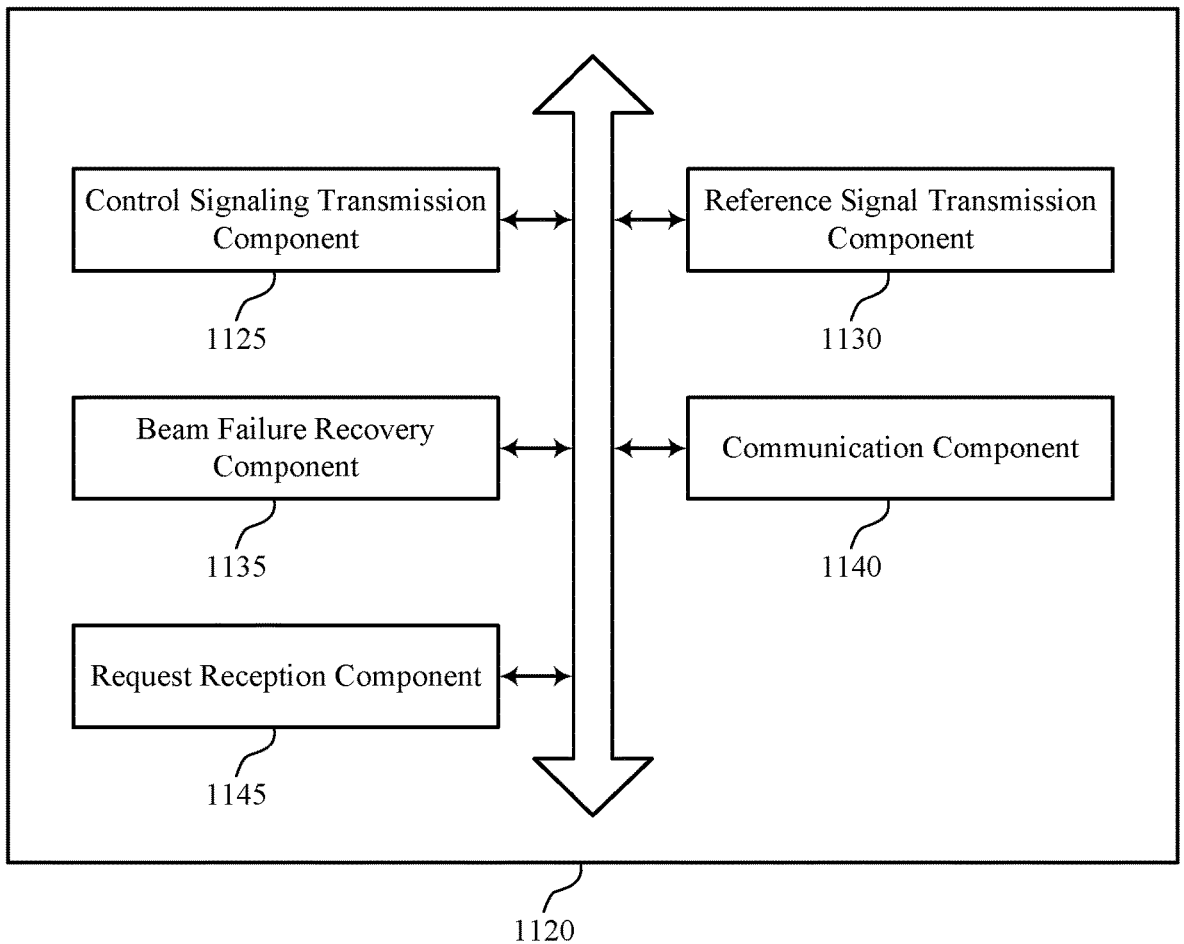
FIG. 11 shows a block diagram of a communications manager that supports techniques for individual beam failure detection in accordance with aspects of the present disclosure.

FIG. 11 shows a block diagram 1100 of a communications manager 1120 that supports techniques for individual BFD in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for individual BFD as described herein. For example, the communications manager 1120 may include a control signaling transmission component 1125, a reference signal transmission component 1130, a beam failure recovery component 1135, a communication component 1140, a request reception component 1145, or any combination thereof. Each of these components may communicate, directly or indirectly, with one another (e.g., via one or more buses).

The communications manager 1120 may support wireless communications at a base station in accordance with examples as disclosed herein. The control signaling transmission component 1125 may be configured as or otherwise support a means for transmitting, to a UE, control signaling indicating an activation of a BFD procedure for detecting beam failure on a per-beam basis for a set of beams. The reference signal transmission component 1130 may be configured as or otherwise support a means for transmitting a set of reference signals via the set of beams. The beam failure recovery component 1135 may be configured as or otherwise support a means for receiving signaling indicating a beam failure recovery procedure at the UE for a first beam of the set of beams based on indicating the activation of the BFD procedure.

In some examples, the control signaling transmission component 1125 may be configured as or otherwise support a means for transmitting, to the UE, control signaling indicating BFD parameters for each beam of the set of beams, where receiving the signaling indicating the beam failure recovery procedure for the first beam is based on a first set of BFD parameters for the first beam.

In some examples, the BFD procedure for detecting beam failure on a per-beam basis is based on the BFD parameters for each beam of the set of beams.

In some examples, the BFD parameters include a BFD timer duration, a beam failure count threshold, or both, for each beam of the set of beams.

In some examples, the control signaling transmission component 1125 may be configured as or otherwise support a means for transmitting, to the UE, control signaling indicating selected BFD parameters corresponding to one or more beams of the set of beams, where receiving the signaling indicating the beam failure recovery procedure for the first beam is based on a first selected BFD parameter for the first beam.

In some examples, the request reception component 1145 may be configured as or otherwise support a means for receiving, from the UE, a request to change one or more BFD parameters, where the where the control signaling indicating the selected BFD parameters is transmitted based on receiving the request.

In some examples, the control signaling transmission component 1125 may be configured as or otherwise support a means for transmitting, to the UE, control signaling indicating a beamforming configuration based on receiving the signaling indicating the beam failure recovery procedure for the first beam. In some examples, the communication component 1140 may be configured as or otherwise support a means for communicating with the UE via the second beam and a third beam in accordance with the beamforming configuration.

In some examples, the signaling indicating the beam failure recovery procedure identifies one or more candidate beams.

In some examples, the beam failure recovery component 1135 may be configured as or otherwise support a means for receiving signaling indicating a second beam failure recovery procedure for the second beam at the UE based on indicating the activation of the BFD procedure.

In some examples, the set of reference signals includes a channel state information reference signal, a synchronization signal block, or both.

In some examples, the control signaling is transmitted in a radio resource control message, a medium access control control element, a downlink control information message, or any combination thereof.

Figure 12:
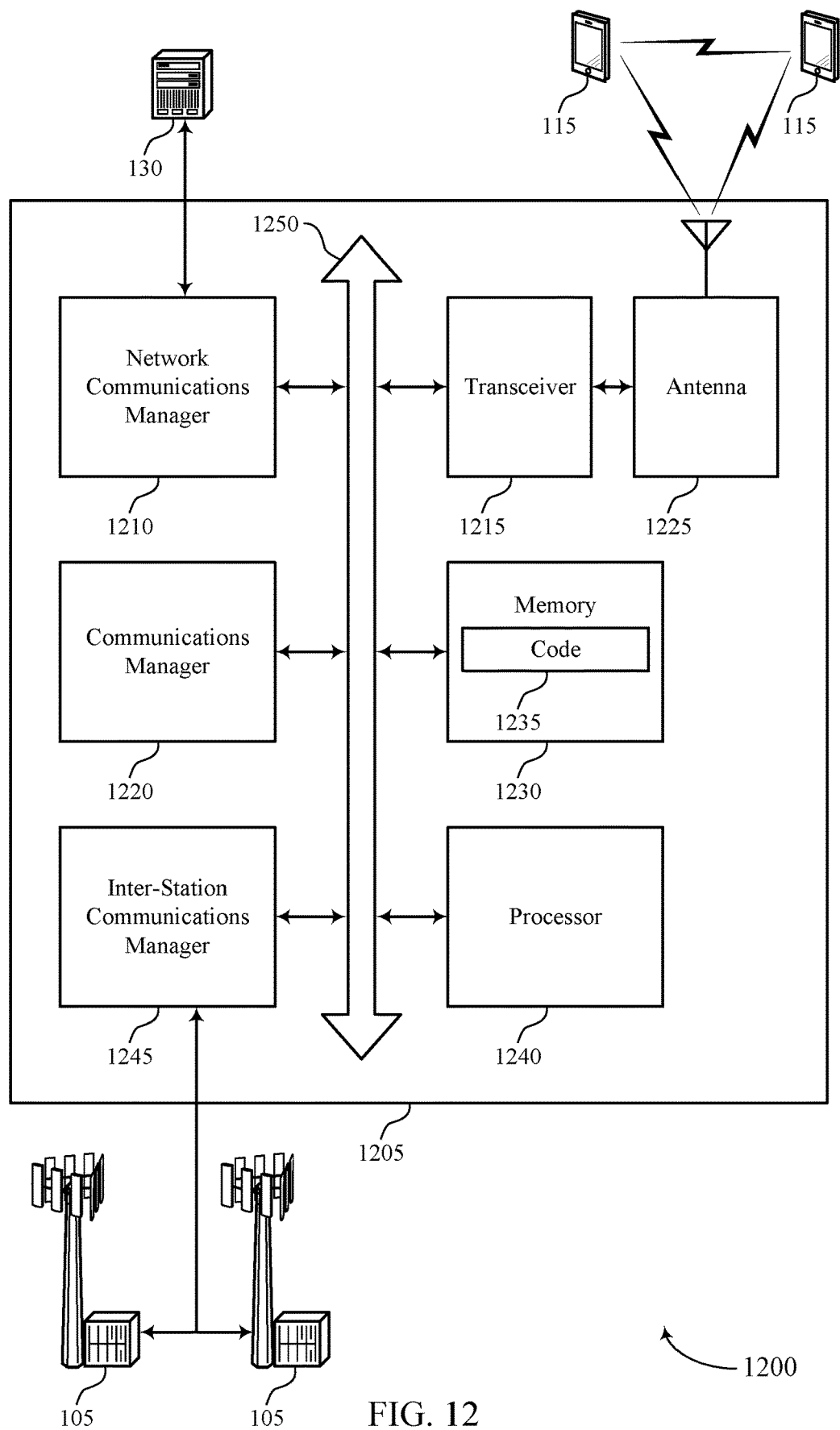
FIG. 12 shows a diagram of a system including a device that supports techniques for individual beam failure detection in accordance with aspects of the present disclosure.

FIG. 12 shows a diagram of a system 1200 including a device 1205 that supports techniques for individual BFD in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for individual BFD). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, control signaling indicating an activation of a BFD procedure for detecting beam failure on a per-beam basis for a set of beams. The communications manager 1220 may be configured as or otherwise support a means for transmitting a set of reference signals via the set of beams. The communications manager 1220 may be configured as or otherwise support a means for receiving signaling indicating a beam failure recovery procedure at the UE for a first beam of the set of beams based on indicating the activation of the BFD procedure.

By including or configuring the communications manager 1220 in accordance with examples as described herein, the device 1205 may support techniques for improved beam communication reliability, increased beam service consistency, improved user experience related to a faster and more accurate reaction to varying wireless channel conditions, more efficient utilization of communication resources, and improved beam failure recovery coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for individual BFD as described herein, or the processor 1240 and the memory 1230 may be otherwise configured to perform or support such operations.

Figure 13:
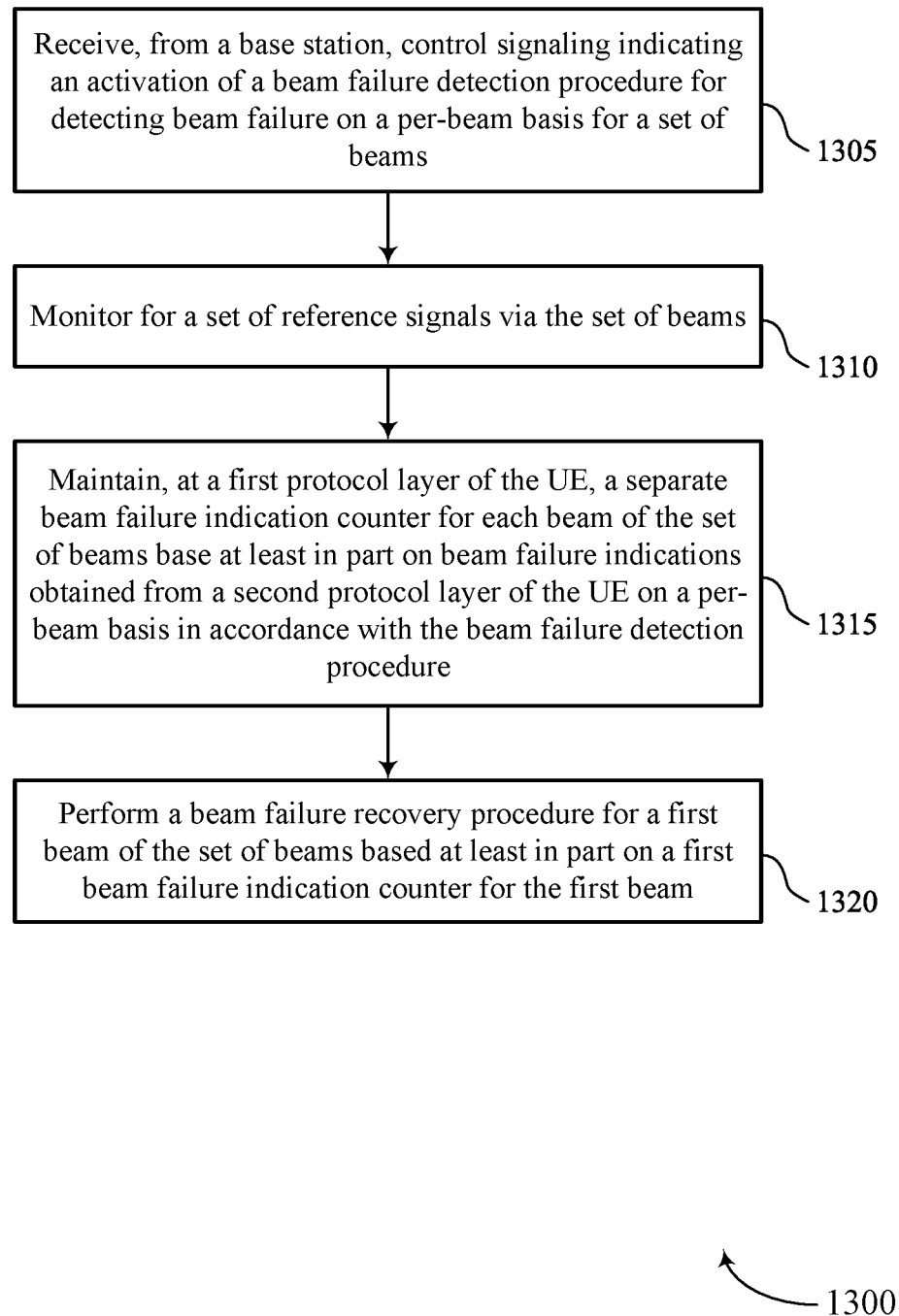
FIGS. 13 through 16 show flowcharts illustrating methods that support techniques for individual beam failure detection in accordance with aspects of the present disclosure.

FIG. 13 shows a flowchart illustrating a method 1300 that supports techniques for individual BFD in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling indicating an activation of a BFD procedure for detecting beam failure on a per-beam basis for a set of beams. The operations of 1305 may be performed in accordance with examples as disclosed herein. In some examples, aspects of the operations of 1305 may be performed by a control signaling reception component 725 as described with reference to FIG. 7.

At 1310, the method may include monitoring for a set of reference signals via the set of beams. The operations of 1310 may be performed in accordance with examples as disclosed herein. In some examples, aspects of the operations of 1310 may be performed by a reference signal monitoring component 730 as described with reference to FIG. 7.

At 1315, the method may include maintaining, at a first protocol layer of the UE, a separate beam failure indication counter for each beam of the set of beams based on beam failure indications obtained from a second protocol layer of the UE on a per-beam basis in accordance with the BFD procedure. The operations of 1315 may be performed in accordance with examples as disclosed herein. In some examples, aspects of the operations of 1315 may be performed by a BFI counting component 735 as described with reference to FIG. 7.

At 1320, the method may include performing a beam failure recovery procedure for a first beam of the set of beams based on a first beam failure indication counter for the first beam. The operations of 1320 may be performed in accordance with examples as disclosed herein. In some examples, aspects of the operations of 1320 may be performed by a beam failure recovery component 740 as described with reference to FIG. 7.

Figure 14:
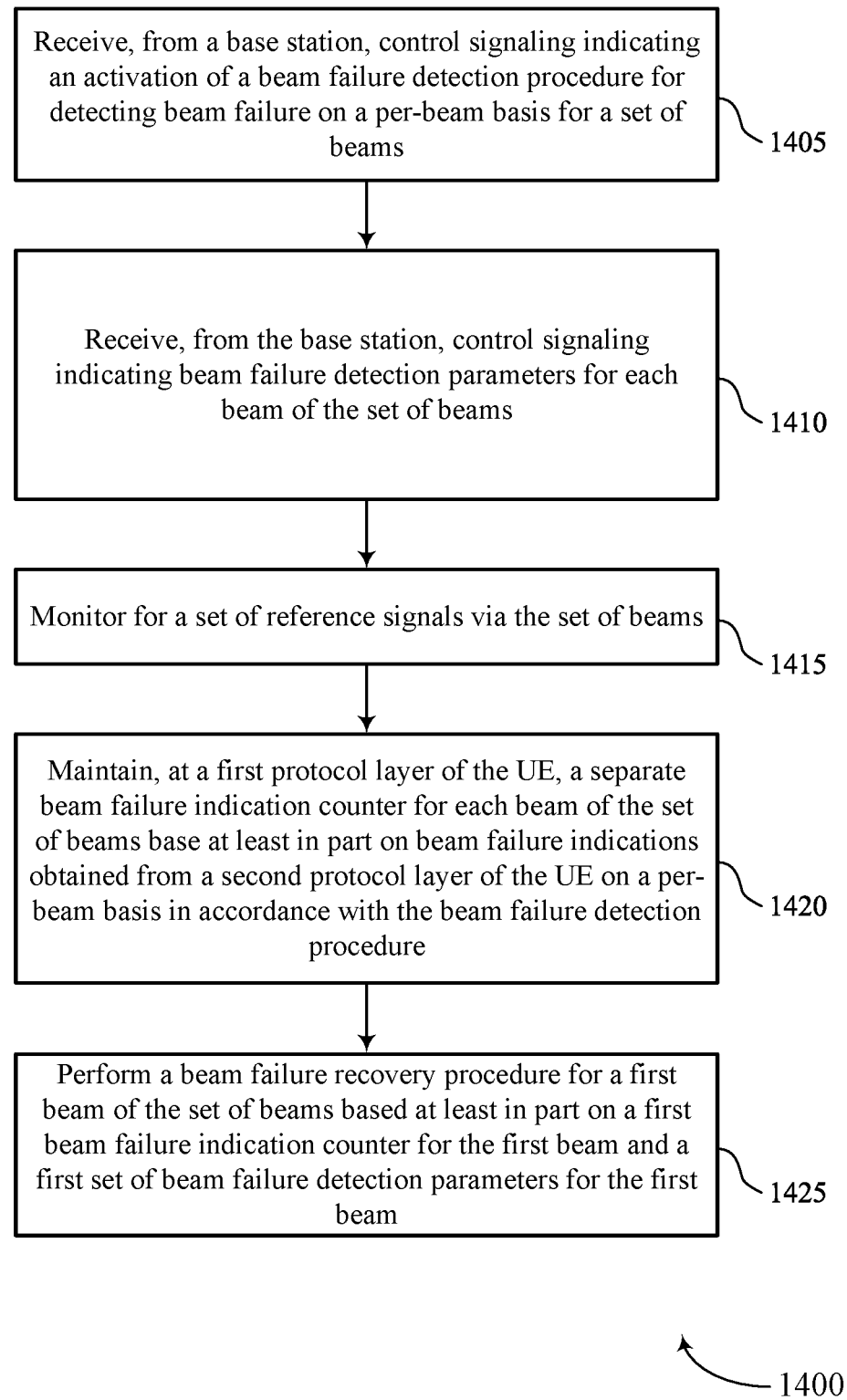

FIG. 14 shows a flowchart illustrating a method 1400 that supports techniques for individual BFD in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling indicating an activation of a BFD procedure for detecting beam failure on a per-beam basis for a set of beams. The operations of 1405 may be performed in accordance with examples as disclosed herein. In some examples, aspects of the operations of 1405 may be performed by a control signaling reception component 725 as described with reference to FIG. 7.

At 1410, the method may include receiving, from the base station, control signaling indicating BFD parameters for each beam of the set of beams. The operations of 1410 may be performed in accordance with examples as disclosed herein. In some examples, aspects of the operations of 1410 may be performed by a control signaling reception component 725 as described with reference to FIG. 7.

At 1415, the method may include monitoring for a set of reference signals via the set of beams. The operations of 1415 may be performed in accordance with examples as disclosed herein. In some examples, aspects of the operations of 1415 may be performed by a reference signal monitoring component 730 as described with reference to FIG. 7.

At 1420, the method may include maintaining, at a first protocol layer of the UE, a separate beam failure indication counter for each beam of the set of beams based on beam failure indications obtained from a second protocol layer of the UE on a per-beam basis in accordance with the BFD procedure. The operations of 1420 may be performed in accordance with examples as disclosed herein. In some examples, aspects of the operations of 1420 may be performed by a BFI counting component 735 as described with reference to FIG. 7.

At 1425, the method may include performing a beam failure recovery procedure for a first beam of the set of beams based on a first beam failure indication counter for the first beam and a first set of beam failure detection parameters for the first beam. The operations of 1425 may be performed in accordance with examples as disclosed herein. In some examples, aspects of the operations of 1425 may be performed by a beam failure recovery component 740 as described with reference to FIG. 7.

Figure 15:
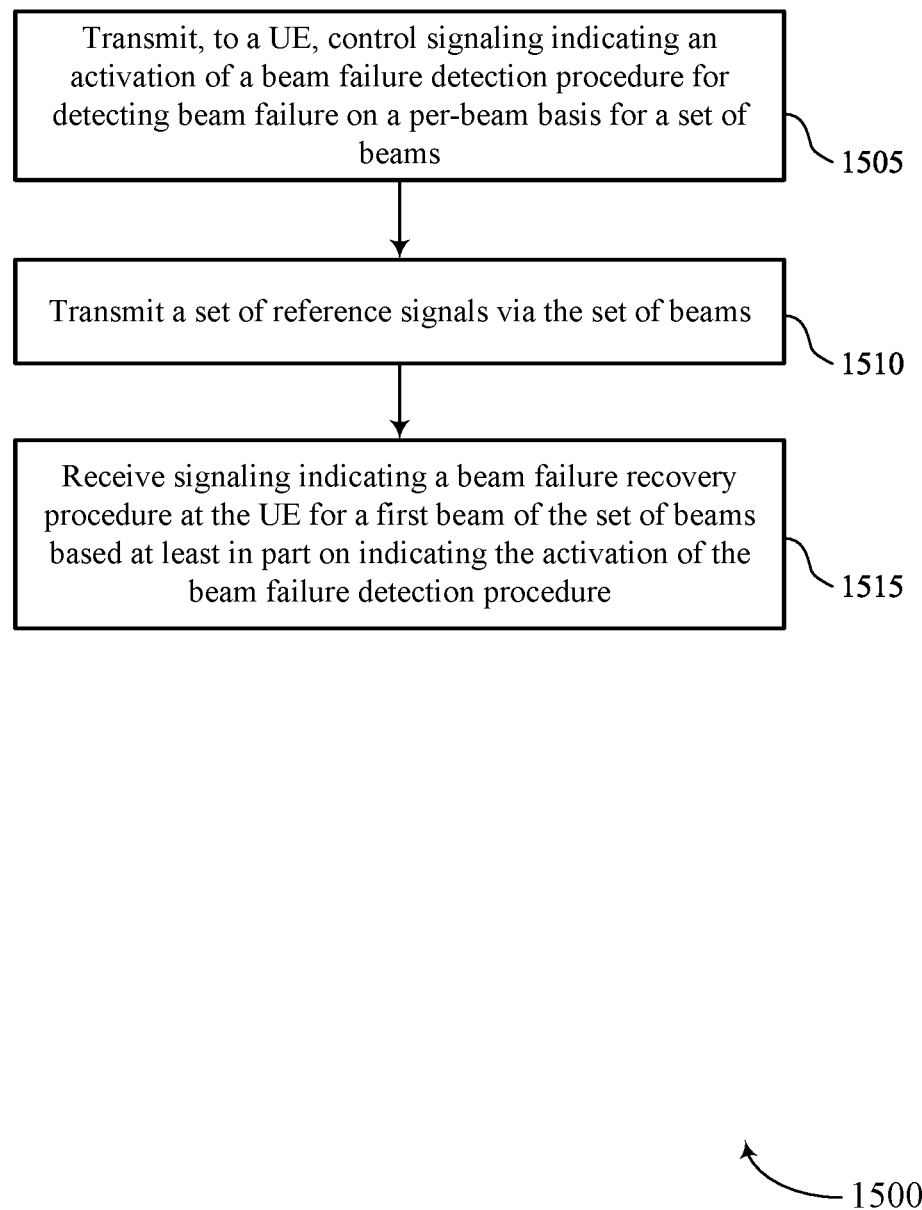

FIG. 15 shows a flowchart illustrating a method 1500 that supports techniques for individual BFD in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, control signaling indicating an activation of a BFD procedure for detecting beam failure on a per-beam basis for a set of beams. The operations of 1505 may be performed in accordance with examples as disclosed herein. In some examples, aspects of the operations of 1505 may be performed by a control signaling transmission component 1125 as described with reference to FIG. 11.

At 1510, the method may include transmitting a set of reference signals via the set of beams. The operations of 1510 may be performed in accordance with examples as disclosed herein. In some examples, aspects of the operations of 1510 may be performed by a reference signal transmission component 1130 as described with reference to FIG. 11.

At 1515, the method may include receiving signaling indicating a beam failure recovery procedure at the UE for a first beam of the set of beams based on indicating the activation of the BFD procedure. The operations of 1515 may be performed in accordance with examples as disclosed herein. In some examples, aspects of the operations of 1515 may be performed by a beam failure recovery component 1135 as described with reference to FIG. 11.

Figure 16:
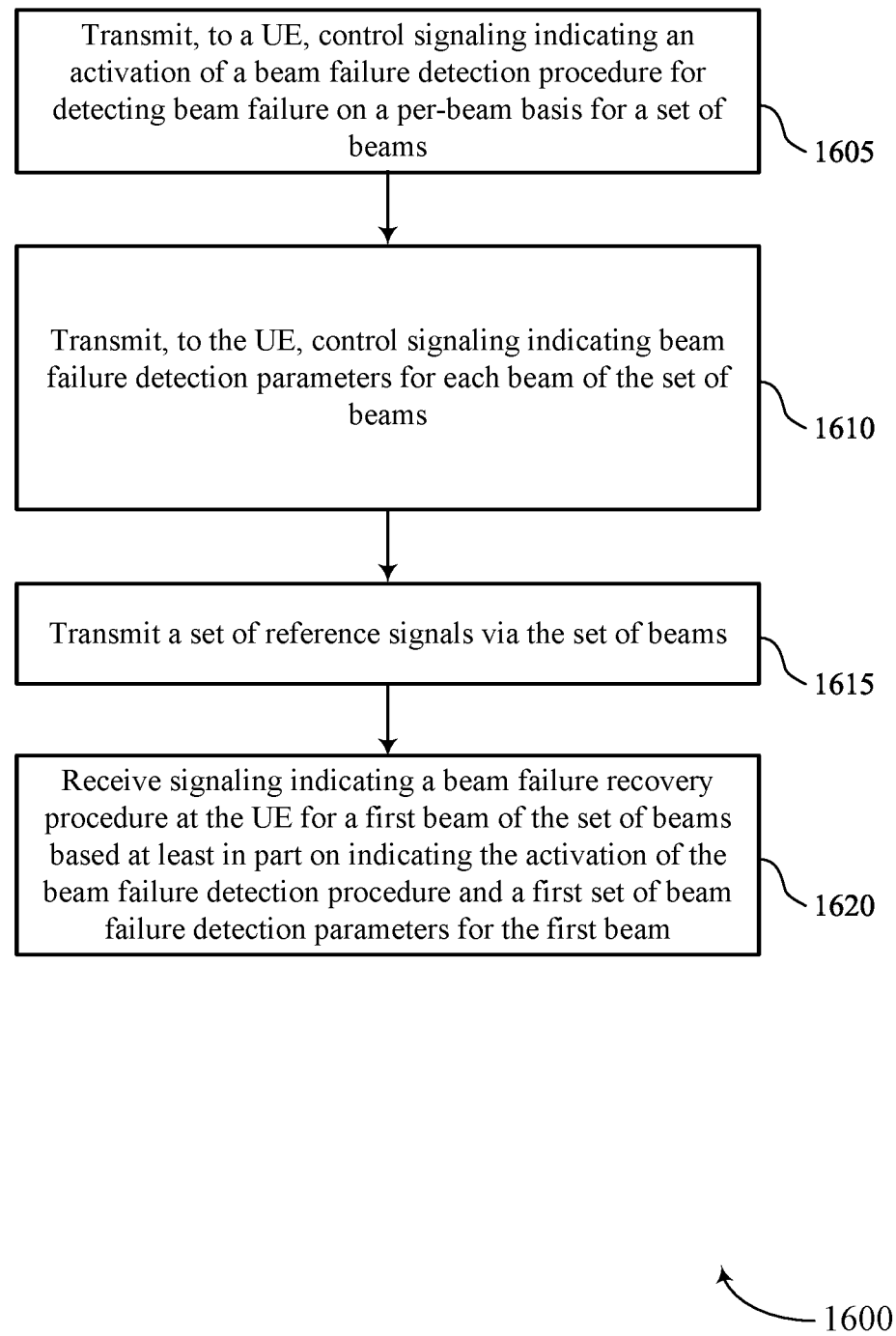

FIG. 16 shows a flowchart illustrating a method 1600 that supports techniques for individual BFD in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling indicating an activation of a BFD procedure for detecting beam failure on a per-beam basis for a set of beams. The operations of 1605 may be performed in accordance with examples as disclosed herein. In some examples, aspects of the operations of 1605 may be performed by a control signaling transmission component 1125 as described with reference to FIG. 11.

At 1610, the method may include transmitting, to the UE, control signaling indicating BFD parameters for each beam of the set of beams. The operations of 1610 may be performed in accordance with examples as disclosed herein. In some examples, aspects of the operations of 1610 may be performed by a control signaling transmission component 1125 as described with reference to FIG. 11.

At 1615, the method may include transmitting a set of reference signals via the set of beams. The operations of 1615 may be performed in accordance with examples as disclosed herein. In some examples, aspects of the operations of 1615 may be performed by a reference signal transmission component 1130 as described with reference to FIG. 11.

At 1620, the method may include receiving signaling indicating a beam failure recovery procedure at the UE for a first beam of the set of beams based on indicating the activation of the BFD procedure and a first set of BFD parameters for the first beam. The operations of 1620 may be performed in accordance with examples as disclosed herein. In some examples, aspects of the operations of 1620 may be performed by a beam failure recovery component 1135 as described with reference to FIG. 11.

The following provides an overview of aspects of the present disclosure:

Aspect 1: A method for wireless communications at a UE, comprising: receiving, from a base station, control signaling indicating an activation of a beam failure detection procedure for detecting beam failure on a per-beam basis for a set of beams; monitoring for a set of reference signals via the set of beams; maintaining, at a first protocol layer of the UE, a separate beam failure indication counter for each beam of the set of beams based at least in part on beam failure indications obtained from a second protocol layer of the UE on a per-beam basis in accordance with the beam failure detection procedure; and performing a beam failure recovery procedure for a first beam of the set of beams based at least in part on a first beam failure indication counter for the first beam.

Aspect 2: The method of aspect 1, further comprising: receiving, from the base station, control signaling indicating beam failure detection parameters for each beam of the set of beams, wherein performing the beam failure recovery procedure for the first beam is based at least in part on a first set of beam failure detection parameters for the first beam.

Aspect 3: The method of aspect 2, wherein the beam failure detection procedure for detecting beam failure on a per-beam basis is based at least in part on the beam failure detection parameters for each beam of the set of beams.

Aspect 4: The method of any of aspects 2 through 3, wherein the beam failure detection parameters comprise a beam failure detection timer duration, a beam failure count threshold, or both, for each beam of the set of beams.

Aspect 5: The method of any of aspects 2 through 4, further comprising: receiving, from the base station, control signaling indicating selected beam failure detection parameters corresponding to one or more beams of the set of beams, wherein performing the beam failure recovery procedure for the first beam is based at least in part on a first selected beam failure detection parameter for the first beam.

Aspect 6: The method of aspect 5, wherein the beam failure detection procedure for detecting beam failure on a per-beam basis is based at least in part on the selected beam failure detection parameters.

Aspect 7: The method of any of aspects 5 through 6, further comprising: transmitting, to the base station, a request to change one or more beam failure detection parameters, wherein the control signaling indicating the selected beam failure detection parameters is received based at least in part on transmitting the request.

Aspect 8: The method of any of aspects 1 through 7, wherein maintaining the separate beam failure indication counter for each beam of the set of beams comprises: incrementing, at the first protocol layer, the separate beam failure indication counter for each beam of the set of beams based at least in part on obtaining beam failure indications from the second protocol layer on a per-beam basis, wherein performing the beam failure recovery procedure for the first beam is based at least in part on the first beam failure indication counter satisfying a count threshold.

Aspect 9: The method of any of aspects 1 through 8, wherein maintaining the separate beam failure indication counter for each beam of the set of beams comprises: activating, at the first protocol layer, a separate beam failure detection timer for each beam of the set of beams based at least in part on obtaining beam failure indications from the second protocol layer on a per-beam basis, wherein performing the beam failure recovery procedure for the first beam is based at least in part on a quantity of beam failure indications obtained for the first beam before a beam failure detection timer for the first beam expires.

Aspect 10: The method of any of aspects 1 through 9, further comprising: transmitting, to the base station, signaling indicating the beam failure recovery procedure for the first beam.

Aspect 11: The method of aspect 10, further comprising: receiving, from the base station, control signaling indicating a beamforming configuration based at least in part on the signaling indicating the beam failure recovery procedure for the first beam; and communicating with the base station in accordance with the beamforming configuration.

Aspect 12: The method of any of aspects 10 through 11, wherein the signaling indicating the beam failure recovery procedure for the first beam identifies one or more candidate beams.

Aspect 13: The method of any of aspects 1 through 12, further comprising: performing a second beam failure recovery procedure for a second beam of the set of beams based at least in part on a second beam failure indication counter for the second beam.

Aspect 14: The method of any of aspects 1 through 13, further comprising: determining a block error rate associated with the received set of reference signals, wherein the beam failure indications obtained from the second protocol layer are based at least in part on the block error rate satisfying a block error rate threshold for one or more beams of the set of beams.

Aspect 15: The method of any of aspects 1 through 14, wherein the set of reference signals comprises a channel state information reference signal, a synchronization signal block, or both.

Aspect 16: The method of any of aspects 1 through 15, wherein the first protocol layer comprises a medium access control layer and the second protocol layer comprises a physical layer.

Aspect 17: The method of any of aspects 1 through 16, wherein the control signaling is received in a radio resource control message, a medium access control control element, a downlink control information message, or any combination thereof.

Aspect 18: A method for wireless communications at a base station, comprising: transmitting, to a UE, control signaling indicating an activation of a beam failure detection procedure for detecting beam failure on a per-beam basis for a set of beams; transmitting a set of reference signals via the set of beams; receiving signaling indicating a beam failure recovery procedure at the UE for a first beam of the set of beams based at least in part on indicating the activation of the beam failure detection procedure.

Aspect 19: The method of aspect 18, further comprising: transmitting, to the UE, control signaling indicating beam failure detection parameters for each beam of the set of beams, wherein receiving the signaling indicating the beam failure recovery procedure for the first beam is based at least in part on a first set of beam failure detection parameters for the first beam.

Aspect 20: The method of aspect 19, wherein the beam failure detection procedure for detecting beam failure on a per-beam basis is based at least in part on the beam failure detection parameters for each beam of the set of beams.

Aspect 21: The method of any of aspects 19 through 20, wherein the beam failure detection parameters comprise a beam failure detection timer duration, a beam failure count threshold, or both, for each beam of the set of beams.

Aspect 22: The method of any of aspects 19 through 21, further comprising: transmitting, to the UE, control signaling indicating selected beam failure detection parameters corresponding to one or more beams of the set of beams, wherein receiving the signaling indicating the beam failure recovery procedure for the first beam is based at least in part on a first selected beam failure detection parameter for the first beam.

Aspect 23: The method of aspect 22, further comprising: receiving, from the UE, a request to change one or more beam failure detection parameters, wherein the wherein the control signaling indicating the selected beam failure detection parameters is transmitted based at least in part on receiving the request.

Aspect 24: The method of any of aspects 18 through 23, further comprising: transmitting, to the UE, control signaling indicating a beamforming configuration based at least in part on receiving the signaling indicating the beam failure recovery procedure for the first beam; and communicating with the UE via the second beam and a third beam in accordance with the beamforming configuration.

Aspect 25: The method of any of aspects 18 through 24, wherein the signaling indicating the beam failure recovery procedure identifies one or more candidate beams.

Aspect 26: The method of any of aspects 18 through 25, further comprising: receiving signaling indicating a second beam failure recovery procedure for the second beam at the UE based at least in part on indicating the activation of the beam failure detection procedure.

Aspect 27: The method of any of aspects 18 through 26, wherein the set of reference signals comprises a channel state information reference signal, a synchronization signal block, or both.

Aspect 28: The method of any of aspects 18 through 27, wherein the control signaling is transmitted in a radio resource control message, a medium access control control element, a downlink control information message, or any combination thereof.

Aspect 29: An apparatus for wireless communications at a UE, comprising a processor; memory coupled with the processor; and instructions stored in the memory and executable by the processor to cause the apparatus to perform a method of any of aspects 1 through 17.

Aspect 30: An apparatus for wireless communications at a UE, comprising at least one means for performing a method of any of aspects 1 through 17.

Aspect 31: A non-transitory computer-readable medium storing code for wireless communications at a UE, the code comprising instructions executable by a processor to perform a method of any of aspects 1 through 17.

Aspect 32: An apparatus for wireless communications at a base station, comprising a processor; memory coupled with the processor; and instructions stored in the memory and executable by the processor to cause the apparatus to perform a method of any of aspects 18 through 28.

Aspect 33: An apparatus for wireless communications at a base station, comprising at least one means for performing a method of any of aspects 18 through 28.

Aspect 34: A non-transitory computer-readable medium storing code for wireless communications at a base station, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network entity, control signaling indicating an activation of a beam failure detection procedure for detecting beam failure on a per-beam basis for a set of beams;

receiving, for each beam of the set of beams, separate beam failure detection parameters comprising a beam failure count threshold, a beam failure detection timer duration, and a block error rate threshold;
monitoring for a set of reference signals via the set of beams;
maintaining, at a first protocol layer of the UE, a separate beam failure indication counter for each beam of the set of beams based at least in part on beam failure indications obtained from a second protocol layer of the UE on a per-beam basis in accordance with the beam failure detection procedure and the separate beam failure detection parameters; and
performing a beam failure recovery procedure for a first beam of the set of beams based at least in part on a first beam failure indication counter satisfying a first beam failure count threshold for the first beam.

2. The method of claim 1,
wherein performing the beam failure recovery procedure for the first beam is based at least in part on a first set of beam failure detection parameters for the first beam.

3. The method of claim 2, wherein the beam failure detection procedure for detecting beam failure on a per-beam basis is based at least in part on the separate beam failure detection parameters for each beam of the set of beams.

4. The method of claim 2, further comprising:
receiving, from the network entity, control signaling indicating selected beam failure detection parameters corresponding to one or more beams of the set of beams, wherein performing the beam failure recovery procedure for the first beam is based at least in part on a first selected beam failure detection parameter for the first beam.

5. The method of claim 4, wherein the beam failure detection procedure for detecting beam failure on a per-beam basis is based at least in part on the selected beam failure detection parameters.

6. The method of claim 4, further comprising:
transmitting, to the network entity, a request to change one or more beam failure detection parameters, wherein the control signaling indicating the selected beam failure detection parameters is received based at least in part on transmitting the request.

7. The method of claim 1, wherein maintaining the separate beam failure indication counter for each beam of the set of beams comprises:
incrementing, at the first protocol layer, the separate beam failure indication counter for each beam of the set of beams based at least in part on obtaining beam failure indications from the second protocol layer on a per-beam basis, wherein performing the beam failure recovery procedure for the first beam is based at least in part on the first beam failure indication counter satisfying a count threshold.

8. The method of claim 1, wherein maintaining the separate beam failure indication counter for each beam of the set of beams comprises:
activating, at the first protocol layer, a separate beam failure detection timer for each beam of the set of beams based at least in part on obtaining beam failure indications from the second protocol layer on a per-beam basis, wherein performing the beam failure recovery procedure for the first beam is based at least in part on a quantity of beam failure indications obtained for the first beam before a beam failure detection timer for the first beam expires.

9. The method of claim 1, further comprising:
transmitting, to the network entity, signaling indicating the beam failure recovery procedure for the first beam.

10. The method of claim 9, further comprising:
receiving, from the network entity, control signaling indicating a beamforming configuration based at least in part on the signaling indicating the beam failure recovery procedure for the first beam; and
communicating with the network entity in accordance with the beamforming configuration.

11. The method of claim 9, wherein the signaling indicating the beam failure recovery procedure for the first beam identifies one or more candidate beams.

12. The method of claim 1, further comprising:
performing a second beam failure recovery procedure for a second beam of the set of beams based at least in part on a second beam failure indication counter for the second beam.

13. The method of claim 1, further comprising:
determining a block error rate associated with the set of reference signals, wherein the beam failure indications obtained from the second protocol layer are based at least in part on the block error rate satisfying a block error rate threshold for one or more beams of the set of beams.

14. The method of claim 1, wherein the set of reference signals comprises a channel state information reference signal, a synchronization signal block, or both.

15. The method of claim 1, wherein the first protocol layer comprises a medium access control layer and the second protocol layer comprises a physical layer.

16. The method of claim 1, wherein the control signaling is received in a radio resource control message, a medium access control control element, a downlink control information message, or any combination thereof.

17. A method for wireless communications at a network entity, comprising:
transmitting, to a user equipment (UE), control signaling indicating an activation of a beam failure detection procedure for detecting beam failure on a per-beam basis for a set of beams;
transmitting, for each beam of the set of beams, separate beam failure detection parameters comprising a beam failure count threshold, a beam failure detection timer duration, and a block error rate threshold;
transmitting a set of reference signals via the set of beams; and
receiving signaling indicating a beam failure recovery procedure at the UE for a first beam of the set of beams based at least in part on indicating the activation of the beam failure detection procedure.

18. The method of claim 17,
wherein receiving the signaling indicating the beam failure recovery procedure for the first beam is based at least in part on a first set of beam failure detection parameters for the first beam.

19. The method of claim 18, wherein the beam failure detection procedure for detecting beam failure on a per-beam basis is based at least in part on the separate beam failure detection parameters for each beam of the set of beams.

20. The method of claim 18, further comprising:
transmitting, to the UE, control signaling indicating selected beam failure detection parameters corresponding to one or more beams of the set of beams, wherein receiving the signaling indicating the beam failure recovery procedure for the first beam is based at least in part on a first selected beam failure detection parameter for the first beam.

21. The method of claim 20, further comprising:
receiving, from the UE, a request to change one or more beam failure detection parameters, wherein the control signaling indicating the selected beam failure detection parameters is transmitted based at least in part on receiving the request.

22. The method of claim 17, further comprising:
transmitting, to the UE, control signaling indicating a beamforming configuration based at least in part on receiving the signaling indicating the beam failure recovery procedure for the first beam; and
communicating with the UE via a second beam and a third beam in accordance with the beamforming configuration.

23. The method of claim 17, wherein the signaling indicating the beam failure recovery procedure identifies one or more candidate beams.

24. The method of claim 17, further comprising:
receiving signaling indicating a second beam failure recovery procedure for a second beam at the UE based at least in part on indicating the activation of the beam failure detection procedure.

25. The method of claim 17, wherein the set of reference signals comprises a channel state information reference signal, a synchronization signal block, or both.

26. The method of claim 17, wherein the control signaling is transmitted in a radio resource control message, a medium access control control element, a downlink control information message, or any combination thereof.

27. An apparatus for wireless communications at a user equipment (UE), comprising:
a processor; memory coupled with the processor; and
instructions stored in the memory and executable by the processor to cause the apparatus to:

receive, from a network entity, control signaling indicating an activation of a beam failure detection procedure for detecting beam failure on a per-beam basis for a set of beams;
receiving, for each beam of the set of beams, separate beam failure detection parameters comprising a beam failure count threshold, a beam failure detection timer duration, and a block error rate threshold;
monitor for a set of reference signals via the set of beams;
maintain, at a first protocol layer of the UE, a separate beam failure indication counter for each beam of the set of beams base at least in part on beam failure indications obtained from a second protocol layer of the UE on a per-beam basis in accordance with the beam failure detection procedure and the separate beam failure detection parameters; and
perform a beam failure recovery procedure for a first beam of the set of beams based at least in part on a first beam failure indication counter satisfying a first beam failure count threshold for the first beam.

28. An apparatus for wireless communications at a network entity, comprising:
a processor; memory coupled with the processor; and
instructions stored in the memory and executable by the processor to cause the apparatus to:
transmit, to a user equipment (UE), control signaling indicating an activation of a beam failure detection procedure for detecting beam failure on a per-beam basis for a set of beams;
transmit, for each beam of the set of beams, separate beam failure detection parameters comprising a beam failure count threshold, a beam failure detection timer duration, and a block error rate threshold;
transmit a set of reference signals via the set of beams; and
receive signaling indicating a beam failure recovery procedure at the UE for a first beam of the set of beams based at least in part on indicating the activation of the beam failure detection procedure.

* * * * *